(12) United States Patent  
Schmeder

(10) Patent No.: US 12,455,465 B2
(45) Date of Patent: Oct. 28, 2025

(54) COLOR-SELECTIVE PARTIAL POLARIZATION FILTERS FOR MODIFICATION OF HUMAN COLOR VISION WHILE VIEWING COLOR IMAGES IN POLARIZED LIGHT

(71) Applicant: Proaxient Technologies LLC, Richmond, CA (US)

(72) Inventor: Andrew Schmeder, Richmond, CA (US)

(73) Assignee: Proaxient Technologies LLC, Richmond, CA (US)

( * ) Notice: Subject to any disclaimer, the term of this patent is extended or adjusted under 35 U.S.C. 154(b) by 356 days.

(21) Appl. No.: 18/226,484

(22) Filed: Jul. 26, 2023

(65) Prior Publication Data

US 2024/0036359 A1   Feb. 1, 2024

Related U.S. Application Data

(60) Provisional application No. 63/392,247, filed on Jul. 26, 2022.

(51) Int. Cl.
*G02C 7/12* (2006.01)
*G02C 7/10* (2006.01)

(52) U.S. Cl.
CPC ........... *G02C 7/12* (2013.01); *G02C 7/10* (2013.01)

(58) Field of Classification Search
CPC ............. G02C 7/12; G02C 7/10; G02C 7/104
See application file for complete search history.

(56) References Cited

U.S. PATENT DOCUMENTS

| 3,701,590 A | 10/1972 | Zeltzer |
| 4,300,819 A | 11/1981 | Taylor |
| 5,218,386 A | 6/1993 | Levien |

(Continued)

FOREIGN PATENT DOCUMENTS

WO   2022002930 A1   6/2020

OTHER PUBLICATIONS

Maxwell, J. (1857). XVIII.—Experiments on Colour, as perceived by the Eye, with Remarks on Colour-Blindness. Earth and Environmental Science Transactions of The Royal Society of Edinburgh, 21(2), 275-298. doi: 10.1017/S0080456800032117.

*Primary Examiner* — Tuyen Tra
(74) *Attorney, Agent, or Firm* — My Patent Guys; Christopher Pilling

(57) ABSTRACT

A method, system and/or spectacle eyewear device for modifying the color vision of a person while viewing a color image emitted in linearly polarized light by a display device includes a first lens and a second lens, wherein the lenses each include a color-selective partial polarization filter and the polarization axes the filters are orientated non-parallel to each other and are configured so that a person experiences binocular rivalry due to spectral binocular disparity with respect to the polarized light emitted by the display device. In some variations the polarization axes of the filters are oriented in such a way that the intensity of binocular rivalry is maintained for rotations of the polarized light and/or display device by 45 degrees and by 90 degrees. In some variations the lenses appear substantially identical when viewed in non-polarized light. In some variations the person has color blindness or color vision deficiency.

20 Claims, 11 Drawing Sheets

(56) References Cited

U.S. PATENT DOCUMENTS

| | | | |
|---|---|---|---|
| 5,363,152 | A | 11/1994 | Reed |
| 5,408,278 | A | 4/1995 | Christman |
| 6,089,712 | A | 7/2000 | Harris |
| 6,811,258 | B1 | 11/2004 | Grant |
| 11,221,501 | B2 | 1/2022 | Chalberg |
| 11,892,714 | B2 * | 2/2024 | Chalberg, Jr. ............ G02B 5/22 |
| 12,228,807 | B2 * | 2/2025 | Li .......................... G02C 7/101 |
| 2009/0015786 | A1 | 1/2009 | Harris |
| 2011/0090453 | A1 | 4/2011 | Chen |

* cited by examiner

COLOR-SELECTIVE PARTIAL POLARIZATION FILTERS FOR MODIFICATION OF HUMAN COLOR VISION WHILE VIEWING COLOR IMAGES IN POLARIZED LIGHT

CROSS-REFERENCE TO RELATED APPLICATIONS

The present application claims priority to U.S. Provisional Application Ser. No. 63/392,247 filed Jul. 26, 2023, the disclosure of which is hereby incorporated in its entirety at least by reference.

BACKGROUND OF THE INVENTION

Field of the Invention

The invention relates to ophthalmic devices including spectacle eyewear, stereoscopes and virtual reality headsets comprising optical filters for enhancing, augmenting or otherwise modifying the sense of color vision for persons while viewing a display device emitting a color image in linearly polarized light, including for persons with color vision deficiency (also called color blindness) and for persons with substantially normal color vision.

Description of Related Art

In the human sense of vision, binocular rivalry is visual phenomenon that occurs when each eye receives different images with visual disparity of sufficient magnitude that the human visual cortex is unable to fuse the images into a coherent scene. Differences between images causing binocular rivalry may include differences in geometrical features, or may include differences in lighting intensity, or may include differences in brightness, in hue or in saturation of color. In one example, binocular rivalry may be caused by an unusual orientation of the eyes such as when moving the eyes into a "cross-eyed" position resulting in the experience of "double vision". In another example, binocular rivalry can occur when wearing polarized sunglasses outdoors and viewing a sheet of tempered glass (for example a car window) under outdoor daylight whereby polarized light from the sky may be reflected by the sheet of tempered glass in such a way that each eye perceives a pattern in the intensity of reflected light that is point-of-view dependent such that the small angular distance between the two eyes of a person result in each eye receiving a different image of the pattern. In another example, a person wearing anachromic 3D glasses (the prefix "ana-" meaning "against") may experience binocular rivalry when viewing an image comprising an overlay of two images presented in complementary colors. Examples of glasses with anachromic filtering lenses include spectacle eyewear with a first lens that is red-tinted and a second lens that is cyan-tinted (also called red-cyan glasses), or with a first lens that is blue-tinted and a second lens that is yellow-tinted (also known as the commercial brand name "ColorCode 3-D" glasses). Binocular rivalry may also be experienced by displaying two disparate images to a person's eyes using a stereoscope or virtual reality headset, both of which are types of ophthalmic binocular devices capable of displaying a separate image to each eye.

Methods and devices for causing persons to experience binocular rivalry have been considered by prior inventors for the purpose of enhancing human color vision, and in particular for providing visual assistance to persons with color vision deficiency or color blindness.

In one example, in the article "Experiments on Colour, as perceived by the Eye, with remarks on Colour Blindness" by James Clerk Maxwell published 1855, Maxwell describes his construction of a pair of spectacles with a first lens that is red-tinted and a second lens that is green-tinted and then providing said glasses to a person with color blindness as a method of improving their ability to differentiate between colors that would otherwise appear identical.

In another example, U.S. Pat. No. 3,701,590A filed 1971 Nov. 8 by Zeltzer discloses a method for improving color discrimination in color blind persons by applying to one eye only a corneal contact lens transmitting substantially only red light, while leaving the other eye unfiltered. The wearer of such contact lenses may be better able to discriminate between red and green colors due red colors appearing more brightly, while green colors appear dimmer in one eye only.

In another example, U.S. Pat. No. 4,300,819A filed 1979 Nov. 7 by Taylor discloses a spectacle eyewear device having two lenses, wherein the first lens is clear and the second lens is color-tinted, thus causing a binocular rivalry effect that may be useful to aid the vision of a person with color blindness. In some variations Taylor describes that the eyeglass lenses comprise a mirrored outer surface that is intended to mask the different appearance of the clear and colored lenses for the purpose of improving the aesthetic appearance of the eyewear device.

In another example, U.S. Pat. No. 5,408,278A filed 1990 Nov. 23 by Christman discloses eyeglasses having a pair of lenses where one lens transmits predominantly the long-wavelength half of the visible spectrum (i.e., a yellow-tinted lens), and the other lens transmits predominantly the short-wavelength half of the visible spectrum (i.e., a blue-tinted lens). Christman speculates that the eyewear may be used to improve color vision.

In another example, U.S. Pat. No. 5,218,386A filed 1991 Jun. 19 by Levien discloses eyeglasses having complementary tri-band filters tuned to provide identical white-points, so that the saturation of red, green and blue colors are enhanced by one lens, and the saturation of violet, cyan and yellow colors are enhanced by the other lens. Levien describes the device as being capable of augmenting human color vision.

In another example, U.S. Pat. No. 5,363,152A filed 1992 Dec. 3 by Reed discloses an eyeglass system for enhancing the "true color" of objects, by selectively blocking a color in one eye and selectively transmitting the color to the other eye. Reed describes use of the invention by a hunter who desires to see and follow a blood trail through foliage.

In another example, U.S. Pat. No. 6,089,712A filed 1996 Dec. 4 by Harris discloses eyewear for improving color discrimination by a person with color blindness wherein each eye is provided with a different color filter. In some aspects the filters are provided in a spectacle frame and further treated with a mirror coating to reduce the appearance of differently colored lenses.

In another example, U.S. Pat. No. 6,811,258B1 filed 2003 Jun. 23 by Grant discloses an eyeglass comprising a pair of lenses, one of which is tinted pale green and the other is tinted a shade of yellow. Grant claims the eyeglasses enhance color perception without undesirable disruption of stereo vision (i.e., without causing binocular rivalry), and in particular claims that glasses are useful for enhancing the vision of people over the age of fifty. Color vision discrimination is known to decline gradually as humans age.

In another example, US20110090453A1 filed 2003 Jul. 8 by Chen discloses a spectacle for correcting color blindness comprising a pair of lenses wherein one lens is substantially tinted pink in color and the other lens is tinted green.

In another example, US20090015786A1 filed 2007 Jul. 13 by Harris discloses lenses for augmenting the vision of persons with color blindness comprising a pair of lenses each tinted with a different base color, and subsequently tinted with a neutral (e.g. gray) tint to reduce the appearance of differently colored lenses.

In another example, U.S. Ser. No. 11/221,501B2 filed 2017 Mar. 17 by Chalberg discloses ophthalmic lenses comprising pairs of spectral filters that substantially bisect the spectral response of a cone (e.g., S-, M- or L-cone) in such a way that one eye receives stimulation to that cone only from the short wavelength half of the cone sensitivity spectrum, and the other eye receives stimulation to that cone class only from the long wavelength half of the corresponding cone sensitivity spectrum. In some variations, spectral filters of varying transmittance are disposed on the surface of the lenses in an array structure.

In another example, WO2022002930A1 filed 2020 Jun. 30 by Dubail discloses a method of designing pairs of spectral filters that are metameric (i.e., have the same apparent color) under certain combinations of lighting and transmitted colors (such as skin tones) so that the pair of filters may appear identical in color while providing different spectral transmittance functions. In some examples Dubail claims the wearer is able to achieve benefits such as color enhancement and color blindness correction provided by narrow-band spectral transmittance of a first lens positioned in front of a first eye of a person while the second eye is provided with a standard lens having only broad-band spectral transmittance (i.e., without color enhancement effects) that is substantially metameric with the first lens. Dubail claims the device may reduce some negative consequences of excessive color saturation enhancement.

In spite of these inventive disclosures in the prior art, widespread adoption of spectacle eyewear or other ophthalmic devices employing binocular rivalry to augment human color vision has not yet been achieved, including for persons with normal color vision and for persons with color blindness or color vision deficiency.

Furthermore, the rising importance of digital display devices in daily work and entertainment presents a new domain for color vision that has not been specifically addressed by the prior art. The need for improved ophthalmic devices employing binocular rivalry to improve color vision, and especially for use with display devices such as computers, televisions, laptops, tablets, mobile phones, etc., and especially for persons with color vision deficiency or color blindness, and that can be delivered in the form of a useful product that is effective and economical for consumers remains an unsolved problem. Consequently, a solution is provided herein.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In a first aspect, a spectacle eyewear device is provided, the device comprising a first lens configured to filter light received by the first eye of a person using the device; a second lens configured to filter light received by the second eye of a person using the device, wherein the lenses each comprise a color-selective partial polarization filter; and, within a first spectral sub-band consisting of a 50 nanometer wide sub-band located between 450 nanometers to 650 nanometers, the mean spectral polarization efficiency of the color-selective partial polarization filters is greater than 30 percent; and within a second spectral sub-band consisting of a 50 nanometer wide sub-band located between 450 nanometers to 650 nanometers and not overlapping with the first spectral sub-band the mean spectral polarization efficiency of the color-selective partial polarization filters is greater than 20 percent; and the polarization axis of the color-selective partial polarization filter in the first lens is oriented between 30 degrees to 90 degrees away from the polarization axis of the color-selective partial polarization filter in the second lens.

In some embodiments of the spectacle eyewear device, the polarization axis of the color-selective partial polarization filter in the first lens is substantially perpendicular to the polarization axis of the color-selective partial polarization filter in the second lens.

In some embodiments of the spectacle eyewear device, the polarization axis of the color-selective partial polarization filter in the first lens is substantially oriented 22.5 degrees clockwise from the horizontal axis of the lens, and the polarization axis of the color-selective partial polarization filter in the second lens is substantially oriented 112.5 degrees from the horizontal axis of the lens.

In some embodiments of the spectacle eyewear device, the polarization axis of the color-selective partial polarization filter in the first lens is substantially oriented 67.5 degrees clockwise from the horizontal axis of the lens, and the polarization axis of the color-selective partial polarization filter in the second lens is substantially oriented 157.5 degrees clockwise from the horizontal axis of the lens.

In some embodiments of the spectacle eyewear device, with respect to non-polarized white light having a spectral power distribution substantially consistent with a 4100K CCT phosphor-converted blue-pumped light-emitting diode, the first lens and the second lens have substantially the same color appearance.

In another aspect, a method for modifying the color vision of a person while the person is viewing a display device is provided, the method comprising providing a first lens and a second lens; positioning the lenses proximally to the eyes of the person in such a way that the first lens substantially filters light received by the first eye of the person, wherein the second lens substantially filters light received by the second eye of the person; and the person viewing the display device through the lenses while the display device emits a color image in linearly polarized light, wherein the lenses each comprise a color-selective partial polarization filter; and, within a first spectral sub-band consisting of a 50 nanometer wide sub-band located between 450 nanometers to 650 nanometers, the mean spectral polarization efficiency of the color-selective partial polarization filters is greater than 30 percent; and within a second spectral sub-band consisting of a 50 nanometer wide sub-band located between 450 nanometers to 650 nanometers and not overlapping with the first spectral sub-band the mean spectral polarization efficiency is less than 20 percent; and the polarization axis of the color-selective partial polarization filter in the first lens is oriented between 30 degrees to 90 degrees away from the polarization axis of the color-selective partial polarization filter in the second lens.

In some embodiments of the method, the polarization axis of the color-selective partial polarization filter in the first lens is substantially perpendicular to the polarization axis of the color-selective partial polarization filter in the second lens.

In some embodiments of the method, the polarization axis of the color-selective partial polarization filter in the first lens is substantially oriented 22.5 degrees clockwise from the horizontal axis of the lens, and the polarization axis of the color-selective partial polarization filter in the second lens is substantially oriented 112.5 degrees from the horizontal axis of the lens.

In some embodiments of the method, the polarization axis of the color-selective partial polarization filter in the first lens is substantially oriented 67.5 degrees clockwise from the horizontal axis of the lens, and the polarization axis of the color-selective partial polarization filter in the second lens is substantially oriented 157.5 degrees clockwise from the horizontal axis of the lens.

In some embodiments of the method, with respect to non-polarized white light having a spectral power distribution substantially consistent with a 4100K CCT phosphor-converted blue-pumped light-emitting diode, the first lens and the second lens have substantially the same color appearance.

In some embodiments of the method, the person has color vision deficiency.

In another aspect, a system for modification of human color vision while viewing a color image emitted by a display device in linearly polarized light is provided, the system comprising a display device emitting a color image in linearly polarized light; a first lens configured to filter light emitted by the display device; and a second lens configured to filter light emitted by the display device, wherein the lenses each comprise a color-selective partial polarization filter; and, within a first spectral sub-band consisting of a 50 nanometer wide sub-band located between 450 nanometers to 650 nanometers, the mean spectral polarization efficiency of the color-selective partial polarization filters is greater than 30 percent; and within a second spectral sub-band consisting of a 50 nanometer wide sub-band located between 450 nanometers to 650 nanometers and not overlapping with the first spectral sub-band the mean spectral polarization efficiency is less than 20 percent; and the polarization axis of the color-selective partial polarization filter in the first lens is oriented between 30 degrees to 90 degrees away from the polarization axis of the color-selective partial polarization filter in the second lens.

In some embodiments of the system, the polarization axis of the color-selective partial polarization filter in the first lens is substantially perpendicular to the polarization axis of the color-selective partial polarization filter in the second lens.

In some embodiments of the system, the polarization axis of the color-selective partial polarization filter in the first lens is substantially oriented 22.5 degrees clockwise from the horizontal axis of the first lens, and the polarization axis of the color-selective partial polarization filter in the second lens is substantially oriented 112.5 degrees from the horizontal axis of the second lens.

In some embodiments of the system, the polarization axis of the color-selective partial polarization filter in the first lens is substantially oriented 67.5 degrees clockwise from the horizontal axis of the first lens, and the polarization axis of the color-selective partial polarization filter in the second lens is substantially oriented 157.5 degrees clockwise from the horizontal axis of the second lens.

In some embodiments of the system, the display device is configured to emit a stereoscopic pair of images, wherein the pair of images are emitted in linearly polarized light having a common polarization axis, and the first lens is configured to substantially filter the emitted portion of light consisting of the first image, and the second lens is configured to substantially filter the emitted portion of light consisting of the second image.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE INVENTION

Figure 1:
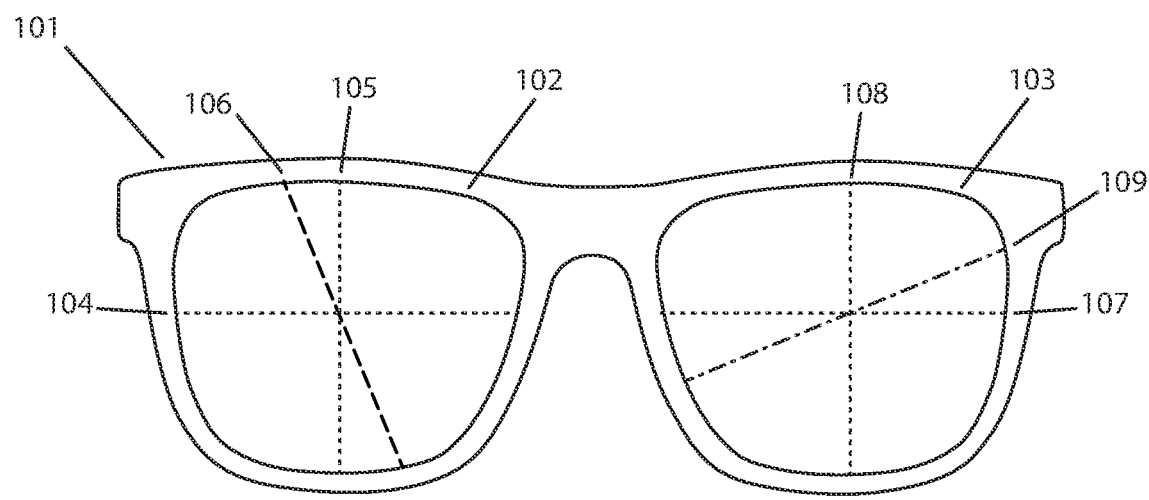
FIG. 1 is a front view of a spectacle eyewear device according to an embodiment of the present invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically to provide ophthalmic devices, systems and methods to modify the color vision of a person while viewing a display device outputting a color image in linearly polarized light, including for persons with normal color vision and for persons with color vision deficiency.

For the purposes of this disclosure, the term "substantially" is defined to mean "essentially" or "approximately," wherein the terms refer to a range of numbers that one of skill in the art would consider near the stated amount, for example by about 1%, 5%, or 10%, including increments, even if numeric values are not explicitly indicated. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time.

For the purposes of this disclosure, the following terminologies are used to assist in the detailed description of one or more embodiments of the present invention:

An ophthalmic device is an apparatus for use with the human eye. A binocular ophthalmic device is an apparatus for use by a person with both eyes.

In descriptions of a binocular ophthalmic device herein, a reference to the first eye may refer to the right eye or to the left eye of a person. For example, the first eye may be the right eye and the second eye may be the left eye, or the first eye may be the left eye and the second eye may be the right eye.

In humans, each eye has a monocular field of view of approximately 135 degrees horizontally and 180 degrees vertically. The right and left eyes of a person combine into a binocular visual field having a field of view of approximately 110 degrees horizontally. A binocular visual field may be a real view of a scene in space, or may be formed virtually for example using a stereoscope or virtual reality headset.

Within a field of view the eye or eyes are at the center of an imaginary sphere with the pole of the sphere at the center point of fixation. A meridian refers to a polar axis of the sphere which may have an angle between zero to 180 degrees measured clockwise from the horizontal meridian. The horizontal meridian is the same as the horizon line as seen by a reference person standing on an infinite planar surface. The 90 degree meridian is the same as the vertical meridian, and the 45 degree meridian and the 135 degree meridian refer to lines oriented halfway between the horizontal and vertical meridians.

With respect to the geometry of a binocular ophthalmic device comprising lenses that substantially filter the field of view of the eyes, the horizontal axis describes an imaginary reference line upon each lens that is substantially parallel to the horizontal meridian as seen by the person using the device. Similarly, the vertical axis corresponds with a reference line upon each lens substantially parallel to the vertical meridian. Other reference lines may be stated as an axis in degrees measured clockwise from the horizontal axis, such as the 22.5 degree axis, 45 degree axis, 67.5 degree axis, 112.5 degree axis, 135 degree axis and 157.5 degree axis.

Human color vision includes normal trichromatic vision, which accounts for approximately 95% of the population. The remaining approximately 5% of the population have color vision deficiency. Color vision deficiency (CVD) is a broad term that includes all forms of anomalous color vision in humans. "Color blindness" is a vernacular term that is often used in a non-scientific context to refer to color vision deficiency. The most common types of color vision deficiency are "red-green" type deficiencies caused by inherited genetic substitutions affecting the medium-wavelength sensitive M-cone photopigments or the long-wavelength sensitive L-cone photopigments, whereby such mutations cause a reduction in the difference signals between M-cone and L-cone retinal cells such that the person experiences a reduced ability to detect differences between red and green colors and other shades of color containing a red or green component as a defining characteristic such as purple and blue. Red-green color vision deficiencies include deuteranomaly, deuteranopia, protanomaly and protanopia. Deuteranomaly and protanomaly are types of anomalous trichromatic vision. Deuteranopia and protanopia are forms of dichromatic color vision. Other forms of color vision deficiency include tritanomaly, which is a type of anomalous trichromatic vision and tritanopia, which is a form of dichromatic color vision. Monochromatic color vision deficiencies include S-cone monochromacy and rod monochromacy. Color vision deficiency can be graded as mild, moderate or severe.

A display device is an apparatus for display of visual information, such as an image, video, visual game, numbers, text or other visual information. A full-area two-dimensional display device is an apparatus that presents an image over substantially all of a two-dimensional surface. Examples of full-area two-dimensional display devices include television screens, computer screens, laptop screens, tablet screens, smart watch screens, and mobile phone screens. A full-area two-dimensional display device is most commonly viewed at a distance such that it subtends between 25 degrees to 40 degrees of the horizontal field of view.

A stereoscope is a device for viewing a stereoscopic pair of separate images depicting a left-eye and right-eye view of the same scene. Examples of stereoscopes include stereo microscopes, stereo slide viewers, 3D video goggles, and virtual reality headsets.

An eyewear device is a device worn on the face or the eyes to provide one or more functions including eye protection, refractive correction, and spectral filtering of light. Eyewear devices include contact lenses, spectacles (also called glasses), face shields and goggles. A spectacle eyewear device is an eyewear device comprising a first lens and a second lens and a frame that enables the lenses to be positioned proximally to the eyes so that a substantial portion of the field of view is seen through the lenses. For the purposes of the present disclosure, a substantial portion of the field of view is defined as having a horizontal extent of 25 degrees or greater.

For the purpose of describing orientation of components in an ophthalmic device, the angle of such components may be specified relative to the meridians of the visual field as seen by a person using the ophthalmic device, or relative to an axis of the lens that is substantially parallel to the corresponding meridian, such as in degrees clockwise from the horizontal axis. For example, in an ophthalmic device comprising one or more lenses the lenses are generally positioned approximately normal to the optical axis of each eye. In some examples a lens is substantially rotationally symmetric therefore the function of the lens is invariant with respect to the orientation of the lens. In some examples a lens comprises an orientation-dependent functionality, such as a linear polarization filter. In such cases the ophthalmic device may be constructed with the lenses in a specific orientation to achieve a desired functionality. For example, in sunglasses with polarized lenses, the lenses are oriented so that the polarization axis of the polarizing filter component oriented along the vertical axis of the lens so that the maximum glare filtering is produced when viewing scenes in the outdoor world where glare (e.g., sunlight reflected from horizontal surfaces) is generally linearly polarized with the polarization axis of the light parallel to the horizontal meridian.

When referring to a lens an ophthalmic device, the optical center refers to a point that is approximately coincident with the location of the pupil of one eye of the person when looking straight forward. For example, in a spectacle eyewear device comprising a first lens and a second lens mounted in a spectacle frame, the optical center of the lenses are configured in such a way that their relative distance is equal to the person's inter-pupillary distance. The optical axis of a lens is an imaginary line normal to the lens surface, extending through the pupil of one eye and the optical center of the lens.

The transmittance of an optical filter is the fraction of light (or percentage) of light that passes through the filter, which may be stated in percent from zero to 100 percent. The spectral transmittance is the transmittance as a function of wavelength. For the purposes of the present disclosure, the wavelengths of relevance are the wavelengths of photopically significant visible light between approximately 450 nanometers to approximately 650 nanometers.

The quantity of 100 basis points are used to describe a difference in absolute percentage of 1 percent, e.g. 5 percent is 100 basis points greater than 4 percent, and, 41 percent is 100 basis points greater than 40 percent.

An ophthalmic lens may comprise one or more filters (e.g. films, dyes, reflective coatings, etc). The transmittance of a lens is the transmittance of all such filters in combination. For the purposes of the present disclosure, the transmittance of a lens shall be measured approximately at the optical center of the lens in a direction substantially normal to the surface of the lens and averaged over a circular area of approximately 1 millimeters to 10 millimeters diameter. This method of measuring the transmittance of a lens is consistent with the recommended procedure for measurement of the transmittance properties of sunglasses in American National Standards Institute ANSI Z80.3-2020, "Ophthalmics—Nonprescription Sunglass And Fashion Eyewear Requirements". The transmittance of light refers to the transmittance of non-polarized light unless specified otherwise.

The white-point of a lens or of a filter is the color of a white light after it has been transmitted through the lens or filter. The color may be expressed in chromaticity coordinates, such as the CIE 1931 xy color space. A white-point is defined relative to an illuminant, such as CIE Standard Illuminant D65. For the purpose of analyzing the white-point of sunglass lenses the D65 illuminant is preferable as it approximates the spectral power distribution of average daylight. In the present disclosure, it is preferable to calculate the white-point with respect to Standard Illuminant LED-B3 defined by CIE Publication 15:2018, Colorimetry, 4th edition by Commission Internationale de L'Eclairage, Oct. 1, 2018, which corresponds to the spectral power distribution of an approximately 4100K phosphor-converted blue-pumped light emitting diode. The LED-B3 illuminant is typical of modern electronic light sources including the backlights of display devices and common residential and office light emitters. For the purpose of the present disclosure, the white-point of two lenses shall be defined as being substantially the same if they have a white-point with respect to LED-B3 that is separated by a distance of less than or equal to seven (7) MacAdam's ellipse steps.

The color appearance (or "tint") of a lens generally refers to the color appearance of a lens positioned substantially proximal to a surface (such as a table, or the face of a person), and is also referred to as the "two-pass" color which is formed by white light passing through the lens, reflecting from the surface, and then passing through the lens again. A pair of lenses may have different spectral transmittances while providing substantially identical color appearances.

For the purpose of the present disclosure, two lenses may be regarded as having substantially the same color appearance if they look identical to a person with normal color vision under a specified lighting condition (e.g., indoor residential illumination such as with respect to Illuminant LED-B3, or outdoors under daylight such as with respect to Illuminant D65), and under typical use conditions, e.g. when worn on the face of a person, or placed on a table under ambient non-polarized illumination. Preferably for use in spectacle eyewear devices comprising a pair of lenses, the lenses should appear substantially identical as any mismatch can appear unusual and is aesthetically undesirable.

For the purposes of this disclosure, the following technical terminology for describing polarization filters are used:

A polarizer, or polarization filter, refers to a type of filter that has different transmittance properties depending upon the polarization state of incident light. Unless otherwise specified, all references to polarization states herein refer to linearly polarized light or substantially linearly polarized light (meaning, light without a significant circular polarization component).

The principal transmittance or insertion loss is the transmittance of linearly polarized light incident upon a polarization filter with the polarizer oriented for maximum transmission.

The minor transmittance or blocking efficiency is the transmittance of linearly polarized light with the polarizer oriented for minimum transmission.

The principal transmittance ratio or polarization contrast ratio is the principle transmittance divided by the minor transmittance.

The polarization efficiency is the principle transmittance minus the minor transmittance, divided by the sum of the principle transmittance and the minor transmittance.

The total transmittance is the transmission of a polarizer in non-polarized incident light, and is equal to the average of the principle transmittance and the minor transmittance.

Linear polarizers exhibit polarizing properties that may be characterized by the degree of polarization efficiency or polarization contrast ratio, which can vary with wavelength and incident angle.

The acceptance angle is the maximum deviation from the design incidence angle where the polarizer will still perform within its specifications. For the purposes of the present disclosure the angle of incidence may be assumed to be parallel with the surface normal vector of the filter (e.g., along the optical axis of a lens incorporating such a filter). More specifically, for use of polarization filters incorporated into lenses for viewing of display devices subtending a field of view between 25 to 40 degrees horizontally, the acceptance angles of such filters shall preferably be within plus or minus 12.5 degrees to plus or minus 20 degrees.

The polarization axis of a polarizer is the orientation along which linearly polarized light parallel to that orientation has the greatest transmission (i.e., achieves the principle transmittance).

Linear polarization filters are invariant under a 180 degree rotation and therefore have the symmetry group of a non-square rectangle which is mathematically isomorphic to the Dihedral group D2.

For the purpose of the present disclosure, a horizontal orientation of polarized light is defined as light having its polarization axis parallel to the horizon of the field of view of a person's vision, i.e., is parallel with the horizontal meridian when a person is standing upright and looking forward. Sunlight reflected from the surface of a body of water is an example of horizontally polarized light found in nature. Furthermore, a vertical orientation of polarized light is defined as linearly polarized light having its polarization axis perpendicular to the horizon. For example, a vertically oriented polarizing filter is commonly used in sunglasses to block the horizontally polarized light reflected from the surface of a body of water In the field of ophthalmic devices comprising lenses, the horizontal axis refers to an imaginary reference line upon a lens of the device that is oriented parallel to the apparent horizon line of a person wearing said eyewear device. The vertical axis refers to an imaginary reference line perpendicular to the horizontal axis. The horizontal axis, vertical axis, or other specified axis may be depicted as imaginary reference lines passing through the geometric center of a lens (i.e., the geometric midpoint of a lens), or through the optical center of a lens (i.e., a point coincident with the center of the pupil of a person wearing the lens when mounted in a spectacle eyewear frame and positioned upon the face in the normal manner).

Polymer polarizing filters may be constructed by stretching a dyed polymer film, which may be optionally thermoformed and incorporated into an ophthalmic lens by lamination or injection molding. Polarizing filters may also be constructed by other methods such as specialized deposition techniques of reflective or absorptive material.

The present invention may be practiced using polymer polarization filters or by any other suitable type of polarizing filter capable of producing the transmittance specifications described herein in accordance with embodiments of the present invention, or of other transmittance specifications producing substantially equivalent results.

An ideal polarizer is a theoretical filter that with 100 percent principle transmittance and zero percent minor transmittance, i.e. having zero insertion loss, an infinite contrast ratio and 100 percent polarization efficiency. Within sunglasses and display devices (such as televisions, computer screens, and mobile phones), the most common type of polarizer currently in use consists of a stretched polymer film approximating the ideal polarizer characteristics and has an insertion loss of less than 20 percent, a polarization efficiency of 90 percent or higher, and has a neutral gray color in non-polarized light (e.g. having a spectral total transmittance equal to approximately 40 percent for wavelengths across the visible spectrum).

The present disclosure relates to color-selective partial polarization filters. A color-selective partial polarization filter is a polarizer wherein the spectral polarization efficiency is characterized by having a first spectral sub-band wherein the mean spectral polarization efficiency is relatively high, e.g., greater than 30 percent, and a second non-overlapping spectral sub-band where the mean spectral polarization efficiency is relatively low, e.g. less than 20 percent and wherein the width and locations of the sub-bands are configured in such a way as to cause the transmission of polarized white light to be transformed to a substantially non-white color. For example, when the sub-bands each have a width of approximately 50 nanometers, and are located within the range of wavelengths of greatest photopic sensitivity, specifically between 450 nanometers to 650 nanometers, and have the different amounts of polarization efficiency as described, then a color-selective effect may be readily observed by noting the apparent color of the filter is substantially not gray when viewed under non-polarized white light.

The present disclosure relates to binocular ophthalmic devices wherein a first lens substantially filters light received by the first eye of a person, and a second lens substantially filters light received by the second eye of a person. With respect to linearly polarized light having its polarization axis at one or more orientations, the first lens and the second lens may filter light in substantially different amounts over one or more sub-bands of the visible spectrum, thereby causing the person's vision to be modified by the phenomenon of binocular rivalry.

To quantify the binocular rivalry arising from difference in spectral transmittance of two lenses, the spectral binocular disparity is defined herein as the absolute value of: the transmittance of the first lens minus the transmittance of the second lens, divided by the sum of the transmittance of the first lens and the second lens. The spectral binocular disparity calculation as defined herein is similar to the definition of polarization efficiency. The use of the absolute value function enables the calculation of spectral binocular disparity to be symmetric and positive regardless of which lens transmits a greater fraction of light. The mean spectral binocular disparity refers to the average spectral binocular disparity over a specified range of wavelengths. The spectral binocular disparity, or any related function such as mean spectral binocular disparity, etc, may be measured with respect to non-polarized light, or with respect to polarized light. The spectral binocular disparity is a dimensionless fraction between zero and 100 percent.

In addition, the present disclosure may refer to mathematical functions that are computed over a range of spectral values, such as the mean, minimum and maximum. For example, the mean spectral polarization efficiency between 450 nanometers to 500 nanometers is the average of the spectral polarization efficiency at each wavelength in the range 450 nanometers to 500 nanometers.

For the purpose of any measurement requiring calculation of a mean, minimum or maximum over a range of wavelengths, a sampling method such as calculating at 1 nanometer intervals is preferable, however other step sizes ranging between 0.1 nanometers up to 25 nanometers may also be acceptable. For spectral functions containing narrow-bandwidth features such as notch filters, the sampling step size must be less than or equal to half the width of any such narrow-band feature. Spectral functions such as the spectral transmittance, spectral polarization efficiency and spectral binocular disparity are continuous functions and therefore the inclusion of endpoints in any such calculation is immaterial. Similarly, two spectral ranges may be considered non-overlapping even if they share an endpoint, e.g. the sub-band 450 nanometers to 500 nanometers is non-overlapping with the sub-band 500 nanometers to 550 nanometers.

Spectral ranges of particular relevance to the present disclosure include: 1) between 450 nanometers to 500 nanometers, which substantially corresponds to blue light; 2) between 475 nanometers to 525 nanometers, which substantially corresponds to cyan light; 3) between 500 nanometers to 550 nanometers, which substantially corresponds to green light; 4) between 575 nanometers to 625 nanometers, which substantially corresponds to yellow light; 5) between 600 nanometers to 650 nanometers, which substantially corresponds to red light. The aforementioned wavelength boundaries are a rough approximation of the corresponding color names, but are sufficiently accurate as to enable the detailed descriptions herein.

An embodiment of a spectacle eyewear device constructed in accordance with the present invention is depicted in FIG. 1, wherein a spectacle eyewear device comprises a frame 101, a first lens 102, and a second lens 103. The lenses are annotated with dotted and dashed lines that refer to the orientation of one or more axis lines of relevance to the device construction. The first lens has a horizontal axis which is substantially parallel to the horizontal meridian as seen by a person wearing the frame, and is indicated by the dotted line 104. The first lens furthermore has a vertical axis indicated by the dotted line 105. In one embodiment, the first lens comprises a polarizing filter that is oriented in such a way that the polarization axis, indicated by the dashed line 106, is oriented approximately 67.5 degrees from the horizontal axis of the eyewear device. The second lens 103 is similarly annotated to show a horizontal axis indicated by the dotted line 107 and a vertical axis at 108. In one embodiment, the second lens comprises a polarizing filter that is oriented in such a way that the polarization axis is oriented approximately 157.5 degrees away from the horizontal axis (equivalently, 22.5 degrees away counter-clockwise). Note that, in the foregoing description, the lines depicting the orientation of various axes are for illustrative purposes only and do not necessarily indicate the presence of a material disposed upon or within the lenses. Furthermore, to enable the function of modification of the color vision of a person wearing the spectacle eyewear device in accordance with the present invention, the polarization filters in the first and second lenses are color-selective partial polarization filters. The preferable characteristics of color-selective partial polarization filters for use in the present invention are discussed in detail in further paragraphs of this detailed description.

Figure 2:
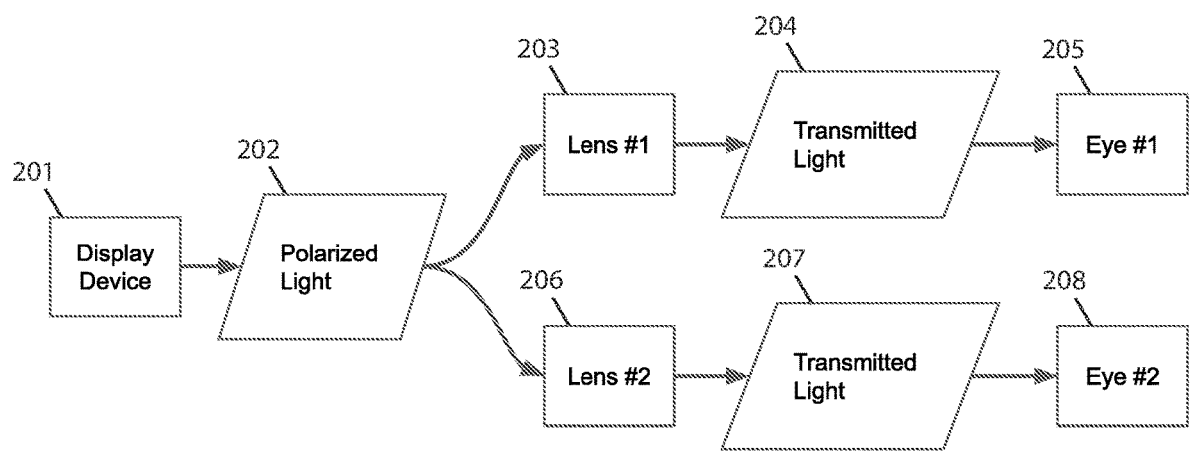
FIG. 2 is process diagram depicting the steps of an embodiment of a method for modifying the vision of a person according to an embodiment of the present invention.

In FIG. 2, a process diagram is provided that describes the steps of an embodiment of a method in accordance with the present invention of using a first lens and a second lens to modify the human sense of color vision for a person while viewing a display device outputting a color image emitted in linearly polarized light. In the method, a display device indicated by 201 emits a color image in linearly polarized light 202. The polarized light emitted by the display 202 travels through space until it is filtered by a first lens 203 and a second lens 206, whereby each lens acts independently to filter the light resulting in the transmission of two separately filtered images 204 and 207, and whereby the lenses are positioned in such a way that the first filtered image 204 is received by the first eye of a person 205 and the second filtered image 207 is received by the second eye of the person 208. For example, the lenses may be provided in a spectacle eyewear device as shown in FIG. 1 so that when the spectacle eyewear device is worn on the face of a person in the usual manner, the person viewing the display device observes some or substantially all of the image output of the display device through the lenses, and the display device may be located between 0.3 to 5 meters away from the eyes and the display device screen subtends between degrees to 40 degrees of the person's horizontal field of view. In another example, the lenses 203 and 206 may be incorporated into a lens carrier enabling attachment of the lenses into a virtual reality headset, wherein the virtual reality headset comprises a display screen positioned approximately 0.1 meters from the person's eyes and forming a virtual binocular field subtending approximately 80 degrees or more of the person's horizontal field of view.

Examples of display devices that emit linearly polarized light include computer screens, television screens, tablet screens, mobile phone screens, virtual reality headset devices, handheld electronic gaming devices, and a wide variety of lab instruments and home appliances that may incorporate a display such as smart refrigerators, video doorbells, etc. Multiple display technologies exist which are capable of emitting color image. The most common types today are liquid crystal displays (LCD), and organic LED (OLED). Commonly such devices are fitted with a polarization filter that may provide one or more functions including enabling a light-valve mechanism to form the image pixels and for reducing the intensity of reflected light from external light sources that may fall on the display surface. Practice of the method relates to the modification of the view of a color image (e.g., an image constructed with red, green and blue primary light colors), therefore monochrome display devices are not relevant to the present discussion.

Figure 3:
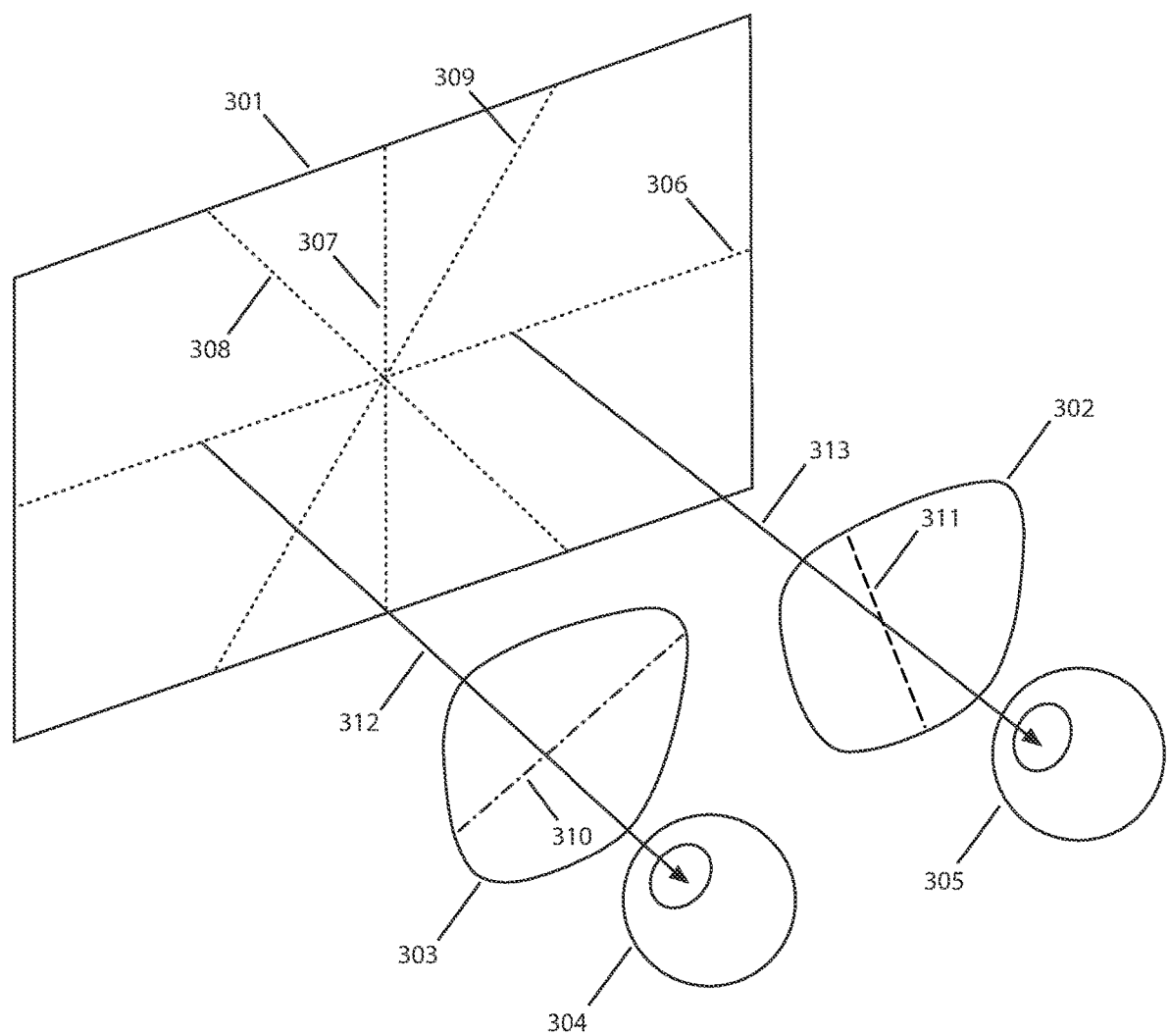
FIG. 3 is a graphical depiction of the operation of a system for modification of the view of a color image emitted by a display device according to an embodiment of the present invention.

In FIG. 3, an isometric drawing is provided depicting an embodiment of a system in accordance with the present invention, wherein the elements of the system may be combined in a spatial configuration as depicted to provide a modification to the color vision of a person viewing a display device. In the diagram, the rectangular boundary at 301 depicts the surface of a two-dimensional display device screen such as a television screen, computer screen or mobile phone screen, wherein the display device is emitting a color image in linearly polarized light. The polarization axis of the emitted light may be oriented along one of four standard directions: a horizontal axis 306, a vertical axis 307, a 45 degree axis 308, or a 135 degree axis 309. Other orientations are possible, however the aforementioned four standard directions account for all display devices known in the art that are available in the consumer market today. The semi-round shape at 302 corresponds to a first lens which is positioned substantially co-planar with the display device screen and is configured in such a way that light emitted by the screen, as indicated by the arrow 313, is substantially filtered by the lens prior to reception by the first eye of a person 305 viewing the screen. The semi-round shape at 303 corresponds to a second lens which is positioned substantially co-planar with the display device screen and in such a way that light emitted by the screen, as indicated by the arrow 312, is substantially filtered by the lens prior to reception by the second eye of a person 304 viewing the screen.

Continuing with the description of FIG. 3, in one embodiment, the first lens 302 comprises a color-selective partial polarization filter having its polarization axis oriented 67.5 degrees from the horizontal axis of the lens 311, and the second lens 303 comprises a color-selective partial polarization filter having its polarization axis 310 oriented 157.5 degrees from the horizontal axis of the lens. Supposing each of the lenses comprises a color-selective polarization filter of substantially equivalent transmission and no other light attenuating materials of substantial impact, then orientations of the polarization filters as shown are configured in such a way that the pair of lenses may cause the person to experience a binocular rivalry of substantially equivalent magnitude provided that polarization axis of the image output by the display device is substantially oriented along any of the four axes shown (e.g., 306, 307, 308, 309). In some embodiments, the lenses may be incorporated into a spectacle eyewear device, for example by inserting the lenses into a spectacle eyewear frame. In alternative embodiments, the lenses may be incorporated into a virtual reality headset, for example by inserting the lenses into a retaining ring that is attached to the inside of the headset.

As discussed in the background section of this application, the use of two lenses with anachromic filtering (e.g., lenses of opposing tint color) has been explored by prior inventors as a means to enhance human vision since at least the year 1855 by the optical scientist James Clerk Maxwell. In addition, it has been noted that a number of improvements to Maxwell's concept by prior inventors have attempted to address the problem of a mismatched appearance of lenses, presumably because of negative cosmetic aspects of wearing a spectacle eyewear device having a pair of lenses with obviously different colors. Generally, any two pair of lenses with a substantially different spectral transmittance will also have different apparent colors as seen by a third party observer. When such lenses are incorporated into a spectacle eyewear device, the mismatched appearances are highly unusual and may attract unwanted attention to the wearer. Methods of mitigating the mismatched appearance include employing a contact lens with the color tint restricted to the pupil area, putting a reflective or "mirror" coating on the outside of a lens, diluting the intensity of coloration by adding a gray pigment, and using narrow-band transmission features to enable lenses to appear metameric while having different transmittances. However, none of these methods are perfectly effective: tinted contact lenses often cannot be centered with enough precision to completely hide the appearance of a colored central region; mirror coatings perform inconsistently depending upon lighting conditions in front of and behind a lens; adding of a gray pigment to a lens reduces the usefulness of the lenses in low light conditions, and finally, designing pairs of lenses to have substantially identical appearance while having different spectral transmittance may fail to maintain metamerism under different lighting conditions such as under daylight and under artificial lighting.

Preferably, in accordance with the present invention, when considering the special case of viewing color images displayed in polarized light, color-selective partial polarization filters may be used in such a way to cause the light to be filtered independently for each eye by means of configuring a pair of color-selective polarization filters with a preferable orientation as to provide a sufficient amount of spectral binocular disparity to cause a person to experience binocular rivalry due to a disparity in the brightness and/or chromaticity of colors as seen in the color image, while the lenses simultaneously appear to have a substantially identical color appearance when viewed in non-polarized light. Commonly, polarized light is emitted by display device such as electronically backlit screens on computers, televisions, mobile phones, etc., while the ambient indoor lighting of residential and commercial spaces is non-polarized. As such, a person may use a spectacle eyewear device comprising such polarized lenses when viewing color images emitted by a display device, while maintaining a completely normal appearance of the eyewear and matched coloration of the lenses as seen by other observers in a room illuminated by non-polarized ambient light.

Figure 4A:
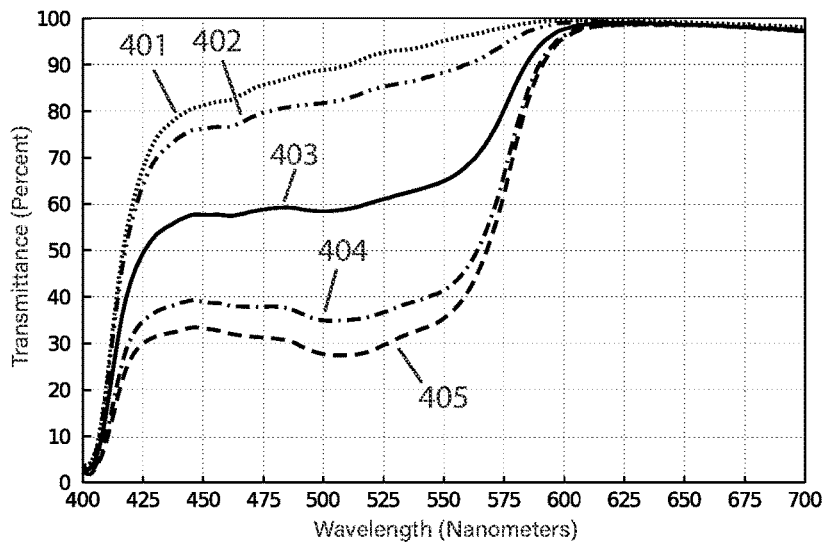
FIG. 4A is a graph of the spectral transmittance properties of an orange-pink color-selective partial polarization filter including its spectral transmittance of non-polarized light, of vertically polarized light, of horizontally polarized light, and of linearly polarized light oriented 22.5 degrees away from the polarization axis of the filter, and 67.5 degrees away from the polarization axis of the filter.
Figure 4B:
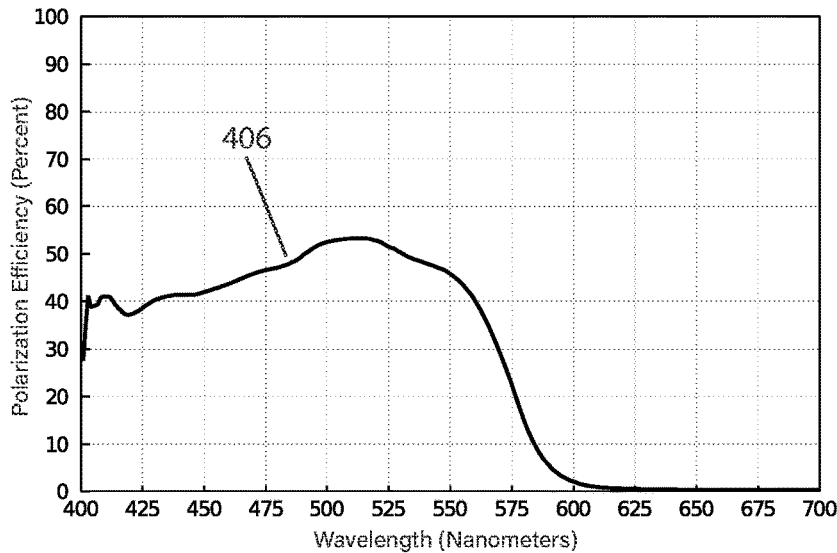
FIG. 4B is a graph of the spectral polarization efficiency of the orange-pink color-selective partial polarization filter.
Figure 4C:
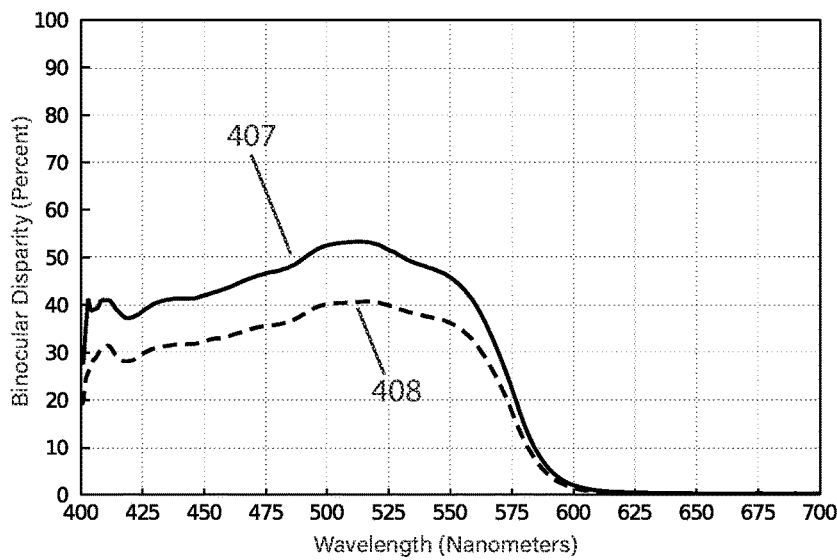
FIG. 4C is a graph of the spectral binocular disparity with respect to linearly polarized light arising from two possible configurations of a pair of lenses comprising the orange-pink color-selective partial polarization filter material.

An example of a color-selective partially polarizing filter material that is useful for practicing the present invention is described hereafter along with FIG. 4A, FIG. 4B and FIG. 4C.

In FIG. 4A, the spectral transmittance of a color-selective partially polarizing filter, commercially available as a stretched polymer film, is plotted over a set of relative angles between the polarizer and the reference polarized light source: the solid line at 403 corresponds to the transmittance of the filter of polarized light oriented at 45 degrees from the polarization axis of the filter. This is also equivalent to the total transmittance of the filter, i.e., its transmittance of non-polarized light. Above and below the solid line 403 are additional plot lines corresponding to the transmittance of the filter of polarized light oriented at other angles oriented between zero and 90 degrees from the polarization axis of the filter: the dotted line 401 corresponds to light at zero degrees, i.e., polarized light parallel with the polarization axis of the filter or the principle transmittance of the filter. The dot-dot-dashed line 402 corresponds to the transmittance of polarized light oriented approximately 22.5 degrees away from the polarization axis of the filter. The dashed line 405 corresponds to the transmittance of polarized light oriented 90 degrees away from the polarization axis of the filter (i.e., the minor transmittance of the filter). The dot-dashed line 404 corresponds to the transmittance of polarized light oriented 67.5 degrees away from the polarization axis of the filter. When viewed in non-polarized light, a lens comprising the polarization filter of FIG. 4A, without any additional filtering elements of substantial impact, will appear to have a "pink-orange" tint.

The pink-orange color-selective partial polarization filter as described in FIG. 4A has a polarization efficiency that varies substantially as a function of wavelength. The spectral polarization efficiency is graphed in FIG. 4B by the solid curve 406. By examining the curve it is readily apparent that in a first spectral sub-band consisting of 450 nanometers to 550 nanometers, the mean spectral polarization efficiency is approximately 45 percent. And, in a second spectral sub-band consisting of 600 nanometers to 650 nanometers, the mean spectral polarization efficiency is less than 5 percent.

In one embodiment, the pink-orange color-selective partial polarization filter as described in FIG. 4A may be incorporated into the lenses of a binocular ophthalmic device to produce spectral binocular disparity of sufficient magnitude to cause binocular rivalry. The spectral binocular disparity arising from examples of two possible configurations of such filters are graphed in FIG. 4C. In a first configuration, with respect to viewing of a polarized color image having the polarization axis of the incident light oriented substantially along the horizontal meridian, a first lens comprising the filter with its polarization axis oriented horizontally and a second lens comprising the filter with its polarization axis oriented vertically produces a spectral binocular disparity plotted by the solid curve 407. The spectral binocular disparity curve 407 also results when axis of the filters in both lenses is rotated by 90 degrees (clockwise or counterclockwise), or when the polarization axis of the light is rotated by 90 degrees. However, in this first configuration of the filters, if the polarization axis of the incident light is rotated by 45 degrees (clockwise or counterclockwise) then the transmittance of the first and second lenses of such oriented polarized light is identical, and therefore the spectral binocular disparity is effectively eliminated. In a second configuration of the filters, a binocular ophthalmic device comprising a first lens with the filter polarization axis oriented at the intermediate angle of 22.5 degrees clockwise from the horizontal axis, and a second lens with the filter polarization axis oriented at the intermediate angle of 112.5 degrees clockwise from the horizontal axis, results in the spectral binocular disparity indicated by the dashed line at 408. The same spectral binocular disparity is achieved for orientations of the first and second filters at the mirror-symmetric intermediate angles of 67.5 and 157.5 degrees. In this configuration, the overall magnitude of spectral binocular disparity (e.g. the mean spectral binocular disparity between 450 nanometers to 650 nanometers) is lower than in the first configuration. However, a preferable advantage of the second configuration is that the spectral binocular disparity is maintained for rotations of the incident polarized light by 45 degrees in either direction, in addition to 90 degrees in either direction. Therefore, a device comprising lenses incorporating color-selective partial polarization filters oriented in the second configuration may be used with display devices having any of the most common orientations of polarized light output: horizontal, vertical, and 45 degrees and 135 degrees.

Further examples of color-selective partially polarizing filters that are useful for practicing the present invention are described hereafter along with FIG. 5A, FIG. 5B, FIG. 5C, FIG. 6A, FIG. 6B, FIG. 6C, FIG. 7A, FIG. 7B and FIG. 7C.

Figure 5A:
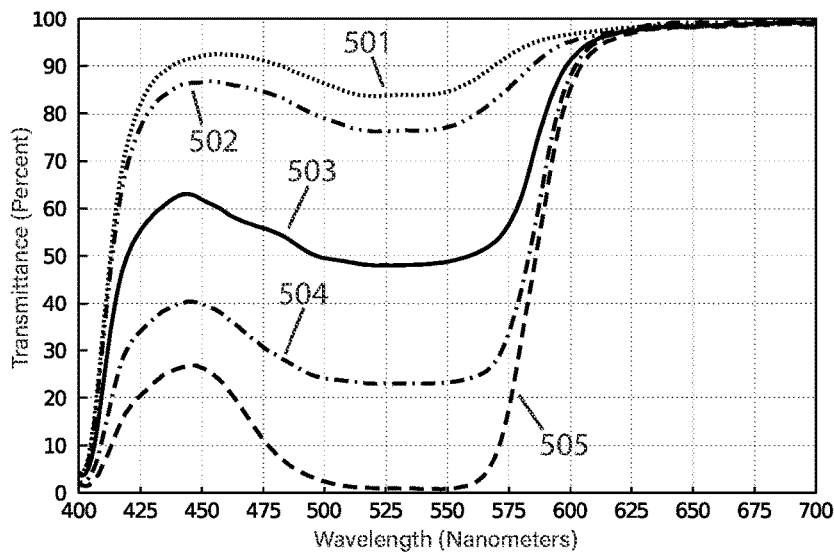
FIG. 5A is a graph of the spectral transmittance properties of a red-pink color-selective partial polarization filter including its spectral transmittance of non-polarized light, of vertically polarized light, of horizontally polarized light, and of linearly polarized light oriented 22.5 degrees away from the polarization axis of the filter, and 67.5 degrees away from the polarization axis of the filter.
Figure 5B:
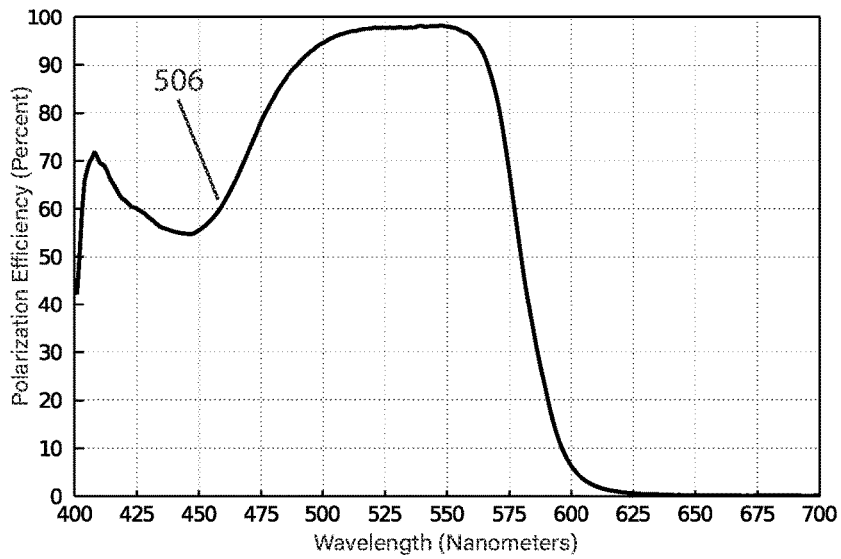
FIG. 5B is a graph of the spectral polarization efficiency of the red-pink color-selective partial polarization filter.

In FIG. 5A, the spectral transmittance of a color-selective partially polarizing filter is plotted over a set of angles between the polarizer axis and the polarized incident light: the solid line at 503 corresponds to the transmittance of the filter of polarized light oriented at 45 degrees from the polarization axis of the filter. The dotted line 501 corresponds to light at zero degrees, i.e., polarized light parallel with the polarization axis of the filter or the principle transmittance of the filter. The dot-dot-dashed line 502 corresponds to the transmittance of polarized light oriented approximately 22.5 degrees away from the polarization axis of the filter. The dashed line 505 corresponds to the transmittance of polarized light oriented 90 degrees away from the polarization axis of the filter (i.e., the minor transmittance of the filter). The dot-dashed line 504 corresponds to the transmittance of polarized light oriented 67.5 degrees away from the polarization axis of the filter. When viewed in non-polarized light, a lens comprising the polarization filter of FIG. 5A (without any other light-attenuating elements of significance) appears to have a "red-pink" color.

The red-pink color-selective partial polarization filter as described in FIG. 5A has a polarization efficiency that varies substantially as a function of wavelength. The spectral polarization efficiency is graphed in FIG. 5B by the solid curve 506. By examining the curve it is readily apparent that in a first spectral sub-band consisting of 500 nanometers to 550 nanometers, the mean spectral polarization efficiency is approximately 95 percent. And, in a second spectral sub-band consisting of 600 nanometers to 650 nanometers, the mean spectral polarization efficiency is less than 5 percent.

In one embodiment, the red-pink color-selective partial polarization filter as described in FIG. 5A may be incorporated into the lenses of a binocular ophthalmic device and then oriented in such a way as to produce a spectral binocular disparity, with the same axis configurations as discussed previously along with description of the orange-pink filter in FIG. 4C. The spectral binocular disparity arising from two example configurations of the filter are graphed in FIG. 5C. In a first configuration, a first lens comprising the filter oriented horizontally and a second lens comprising the filter with its polarization axis oriented vertically produces a spectral binocular disparity plotted by the solid curve 507. In a second configuration, a binocular ophthalmic device comprising a first lens with the filter oriented at the intermediate angle of 22.5 degrees clockwise from the horizontal axis, and a second lens with the filter oriented at the intermediate angle of 112.5 degrees clockwise from the horizontal axis (or the mirror-symmetric configuration of 67.5 degrees and 157.5 degrees), results in the spectral binocular disparity indicated by the dashed line at 508. The properties of the first and second configurations as discussed along with the description of the pink-orange filter configurations also hold for the red-pink filter configurations herein.

Figure 6A:
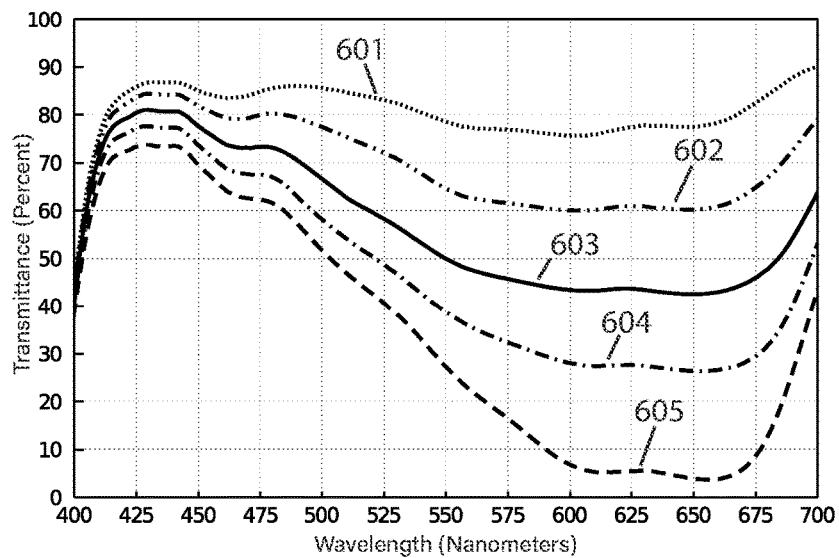
FIG. 6A is a graph of the spectral transmittance properties of a blue color-selective partial polarization filter including its spectral transmittance of non-polarized light, of vertically polarized light, of horizontally polarized light, and of linearly polarized light oriented 22.5 degrees away from the polarization axis of the filter, and 67.5 degrees away from the polarization axis of the filter.
Figure 6B:
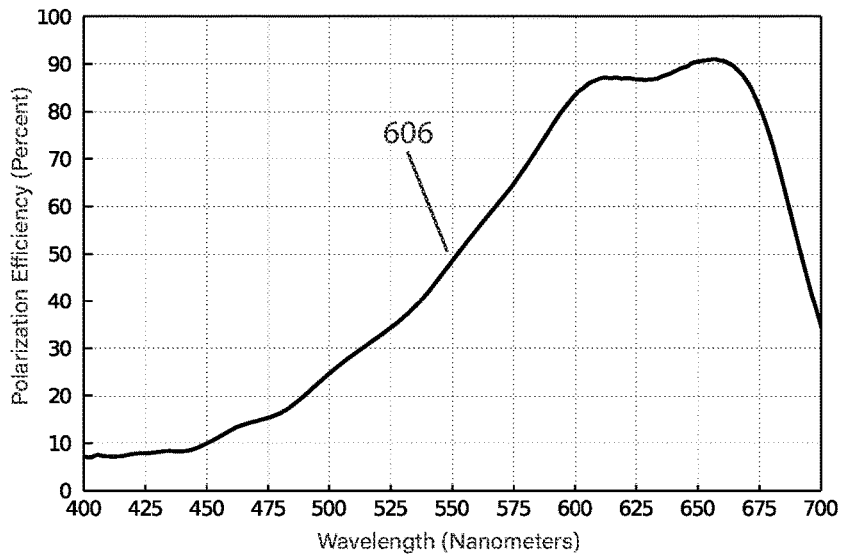
FIG. 6B is a graph of the spectral polarization efficiency of the blue color-selective partial polarization filter.

In FIG. 6A, the spectral transmittance of a color-selective partially polarizing filter is plotted over a set of angles between polarizer axis and the polarized reference light: the solid line at 603 corresponds to the transmittance of the filter of polarized light oriented at 45 degrees from the polarization axis of the filter. The dotted line 601 corresponds to light at zero degrees, i.e., polarized light parallel with the polarization axis of the filter or the principle transmittance of the filter. The dot-dot-dashed line 602 corresponds to the transmittance of polarized light oriented approximately 22.5 degrees away from the polarization axis of the filter. The dashed line 605 corresponds to the transmittance of polarized light oriented 90 degrees away from the polarization axis of the filter (i.e., the minor transmittance of the filter). The dot-dashed line 604 corresponds to the transmittance of polarized light oriented 67.5 degrees away from the polarization axis of the filter. When viewed in non-polarized light, a lens comprising the polarization filter of FIG. 6A (and without any other light-attenuating filters of significant impact) appears to have a "blue" color.

The blue color-selective partial polarization filter as described in FIG. 6A has a polarization efficiency that varies substantially as a function of wavelength. The spectral polarization efficiency is graphed in FIG. 6B by the solid curve 606. By examining the curve it is readily apparent that in a first spectral sub-band consisting of 600 nanometers to 650 nanometers, the mean spectral polarization efficiency is approximately 85 percent. And, in a second spectral sub-band consisting of 450 nanometers to 500 nanometers, the mean spectral polarization efficiency is approximately 20 percent.

In one embodiment, the blue color-selective partial polarization filter as described in FIG. 6A may be incorporated into the lenses of a binocular ophthalmic device to produce a spectral binocular disparity in substantially the same configurations as discussed previously. The spectral binocular disparity arising from two example configurations of the filter are graphed in FIG. 6C. In a first configuration, a first lens comprising the filter oriented horizontally and a second lens comprising the filter with its polarization axis oriented vertically produces a spectral binocular disparity plotted by the solid curve 607. In a second configuration, a binocular ophthalmic device comprising a first lens with the filter oriented at the intermediate angle of 22.5 degrees clockwise from the horizontal axis, and a second lens with the filter oriented at the intermediate angle of 112.5 degrees clockwise from the horizontal axis, results in the spectral binocular disparity indicated by the dashed line at 608. The properties of the first and second configurations as discussed along with the description of the pink-orange filter configurations also hold for the blue filter configurations herein.

Figure 7A:
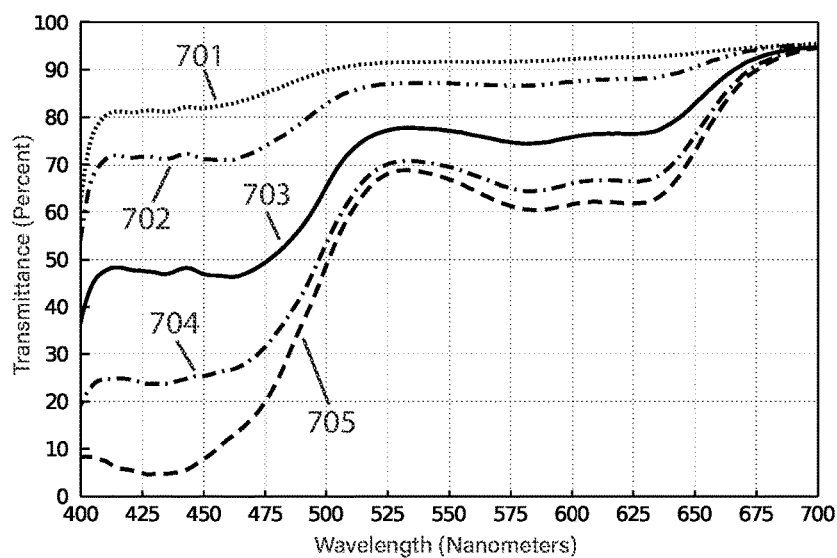
FIG. 7A is a graph of the spectral transmittance properties of a yellow-green color-selective partial polarization filter including its spectral transmittance of non-polarized light, of vertically polarized light, of horizontally polarized light, and of linearly polarized light oriented 22.5 degrees away from the polarization axis of the filter, and 67.5 degrees away from the polarization axis of the filter.
Figure 7B:
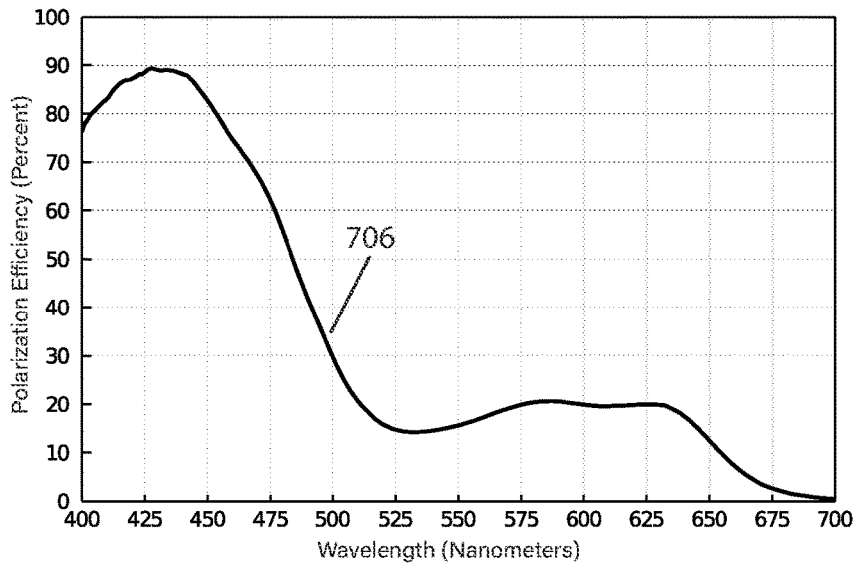
FIG. 7B is a graph of the spectral polarization efficiency of the yellow-green color-selective partial polarization filter.

In FIG. 7A, the spectral transmittance of a color-selective partially polarizing filter is plotted over a set of angles between polarizer axis and the polarized reference light: the solid line at 703 corresponds to the transmittance of the filter of polarized light oriented at degrees from the polarization axis of the filter. The dotted line 701 corresponds to light at zero degrees, i.e., polarized light parallel with the polarization axis of the filter or the principle transmittance of the filter. The dot-dot-dashed line 702 corresponds to the transmittance of polarized light oriented approximately 22.5 degrees away from the polarization axis of the filter. The dashed line 705 corresponds to the transmittance of polarized light oriented 90 degrees away from the polarization axis of the filter (i.e., the minor transmittance of the filter). The dot-dashed line 704 corresponds to the transmittance of polarized light oriented 67.5 degrees away from the polarization axis of the filter. When viewed in non-polarized light, a lens comprising the polarization filter of FIG. 7A (and without any other light-filtering elements of significant impact) appears to have a "yellow-green" color.

The yellow-green color-selective partial polarization filter as described in FIG. 7A has a polarization efficiency that varies substantially as a function of wavelength. The spectral polarization efficiency is graphed in FIG. 7B by the solid curve 706. By examining the curve it is readily apparent that in a first spectral sub-band consisting of 450 nanometers 20 to 500 nanometers, the mean spectral polarization efficiency is approximately 55 percent. And, in a second spectral sub-band consisting of 525 nanometers to 575 nanometers, the mean spectral polarization efficiency is less than approximately 20 percent.

In one embodiment, the yellow-green color-selective partial polarization filter as described in FIG. 7A may be incorporated into the lenses of a binocular ophthalmic device to produce a spectral binocular disparity in substantially the same configurations as discussed previously. The spectral binocular disparity arising from various configurations of the filter are graphed in FIG. 7C. In a first configuration, a first lens comprising the filter oriented horizontally and a second lens comprising the filter with its polarization axis oriented vertically produces a spectral binocular disparity plotted by the solid curve 707. In a second configuration, a binocular ophthalmic device comprising a first lens with the filter oriented at the intermediate angle of 22.5 degrees clockwise from the horizontal axis, and a second lens with the filter oriented at the intermediate angle of 112.5 degrees clockwise from the horizontal axis, results in the spectral binocular disparity indicated by the dashed line at 708. The properties of the first and second configurations as discussed along with the description of the previously described filter configurations also hold for the yellow-green filter configurations herein.

As described above in the description of the embodiment of devices and/or methods and/or systems depicted in FIG. 1, FIG. 2 and FIG. 3, the present invention contemplates use of a color-selective partial polarization filter (for example as shown in FIG. 4A, FIG. 4B, FIG. 4C, FIG. 5A, FIG. 5B, FIG. 5C, FIG. 6A, FIG. 6B, FIG. 6C, FIG. 7A, FIG. 7B, and FIG. 7C).

Preferably, in one embodiment, the color-selective partial polarization filters are configured in such a way that the binocular rivalry phenomenon experienced by the person is substantially maintained with equivalent color disparity when viewing a broad range of common display devices. Many display devices of the prior art were examined and it was observed that the majority of devices emit linearly polarized light that is oriented along one of four standard directions. Computer screens and televisions most commonly employ a polarizing filter that is oriented vertically, which enables the best visibility for a person wearing polarized sunglasses (whereas polarized sunglasses are most commonly constructed with polarizing filters oriented vertically with respect to the wearer's field of view). Occasionally computer screens or televisions have a horizontally oriented polarizer, which may be noticed when wearing polarized sunglasses the screen appears "black out" due to the crossed polarization effect. Some computer screens feature a rotatable mount enabling the display to pivot between a landscape and a portrait orientation, and as such the polarization axis may be either vertical or horizontal depending on the mount configuration. Mobile devices having a display, such as mobile phones and tablets, are most commonly constructed with a polarization filter oriented at 45 degrees with respect to the rectangular display screen of the device. The 45 degree orientation may be preferred by mobile device manufacturers because it ensures consistent readability while wearing polarized sunglasses regardless of whether the handheld device is oriented horizontally or vertically.

Virtual reality headsets also may comprise a polarized display screen in combination with lenses that bring the screen into focus at a close distance. Some virtual reality headsets provide a lens insert system enabling a person to attach a pair of lenses secured by retaining rings to the inside of the headset so that the attached lenses each modify one of the two stereoscopic images emitted by the headset. In the case of virtual reality devices (or other binocular ophthalmic devices such as a stereoscope or augmented reality headset), the need for lenses to have identical appearances need not be a primary consideration in the design or manufacturing or selection of lenses suitable for causing a desired spectral binocular disparity, however the other teachings herein still apply and such lenses may be used to achieve the desired modification to color vision of a person using such a device.

A experimental design process was conducted by the inventor consisting of building a set of spectacle eyewear prototype devices comprising lenses that incorporated color-selective partially polarizing filters (e.g. as described in FIG. 4A, FIG. 4B, FIG. 4C, FIG. 5A, FIG. 5B, FIG. 5C, FIG. 6A, FIG. 6B, FIG. 6C, FIG. 7A, FIG. 7B, and FIG. 7C), and orienting the lenses so that the polarization axis of the filters was placed at various angles such as horizontally, vertically and at 45 degrees and 135 degrees. In a first experiment, the inventor tested an eyewear prototype device comprising a pair of lenses each having the orange-pink color-selective partial polarizing filter as discussed along with FIG. 4A. The inventor configured the lenses in such a way that when viewing a computer screen (emitting vertically polarized light), the first lens of the eyewear was oriented with the filter polarization axis in the vertical orientation, causing the lens to substantially transmit a high percentage of the light (e.g. as shown by the spectral transmittance curve 401 in FIG. 4A), causing the display screen to have a slight orange-pink tint, and the second lens of the eyewear was oriented with the filter polarization axis in the horizontal orientation, causing the lens to substantially block a substantial portion of the light between 500 nanometers to 550 nanometers (e.g. as shown by the spectral transmittance curve 405 in FIG. 4A), causing the display screen to have a strongly colored and orange-pink tint. In spite of these striking differences in lens transmission when viewing a computer screen, the inventor noted that under ordinary room illumination the first and second lenses of the eyewear appeared to have identical color appearance, due to the ambient room illumination consisting of non-polarized light. The inventor tested the assembled eyewear device as described while viewing a variety of color image content (e.g. games, movies, spreadsheets, charts and graphs). In the test, a moderately intense experience of binocular rivalry was noticed, which caused certain colors in the image (especially red shades) to "pop-out". The inventor then tested the eyewear device while viewing a mobile phone (emitting polarized light at 45 degrees), and the inventor noted that the binocular rivalry effect disappeared as each lens transmitted an identical spectrum of light (e.g. according to the spectral transmittance at 403 in FIG. 4A).

Upon further contemplation of the problem of how to provide a preferable modification to color vision while viewing a display device emitting a color image in polarized light, the inventor arrived at the following insight: if a spectacle eyewear device were constructed in such a way that the first and second lens comprise a color-selective partial polarizing filter wherein the polarization axis of the first filter is oriented 22.5 degrees from the vertical axis, and the polarization axis of the second filter is oriented substantially perpendicular to the first filter (i.e., 112.5 degree from the vertical axis), then the eyewear would cause a spectral binocular disparity effect upon the view of a display emitting polarized light, and provide certain preferable properties, including: 1) the intensity of rivalry (i.e., the effective spectral binocular disparity between the first and second lenses) would be slightly reduced, providing greater visual comfort to the user; and 2) the eyewear would provide a substantially identical intensity of spectral binocular disparity for all common orientations of the polarized display device, specifically: horizontally, vertically, or at 45 degrees or at 135 degrees from vertical. Moreover, the orientation combinations of the "intermediate angles", 22.5 degrees and 112.5 degrees, or the mirror-symmetric configuration 67.5 degrees and 157.5 degrees, are the only such configurations capable of providing the desired binocular rivalry effect over all four common orientations of polarized light by display devices. Therefore, the usability of such an embodiment of a binocular ophthalmic device would be greatly enhanced due to improved user acceptance and broad compatibility with the majority of electronic display devices currently in use.

To further explain the purpose of using the "intermediate angle" positions as described above, FIG. 8A, FIG. 8B, FIG. 8C and FIG. 8D depict the orientations of the polarization axis of common display devices, and the relative orientation of the polarization axis of filters incorporated into a first lens and a second lens configured in such a way as to provide a spectral binocular disparity effect upon the view the light emitted by the display device.

Figure 8A:
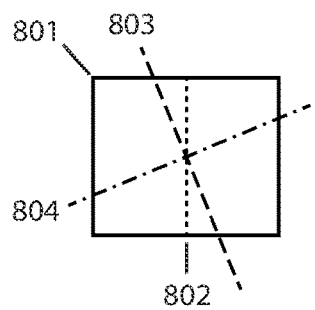
FIG. 8A is a diagram of a common orientation of linearly polarized light emitted by a display device and a preferable orientation of color-selective polarization filters incorporated into a first lens and a second lens of the spectacle eyewear device according to an embodiment of the present invention.

In a first example, in FIG. 8A the rectangle at 801 depicts a display screen such as a computer screen or television, and the dotted line 802 depicts a vertical orientation of polarized light emitted by the screen. The dashed line 803 shows the orientation of a first polarization filter oriented 67.5 degrees clockwise from the horizontal axis, and oriented 22.5 degrees counter-clockwise relative to the axis of the polarized light. The dot-dashed line 804 shows the orientation of a second polarization filter oriented 157.5 degrees clockwise from the horizontal axis and 67.5 degrees clockwise relative to the axis of the polarized light. Therefore, supposing that the first and second polarization filter comprised the color-selective partially polarizing filter material as shown in FIG. 4A: then, the transmittance of the first filter with respect to the display device emitted light would correspond with the dot-dashed contour at 404 in FIG. 4A, and, the transmittance of the second filter with respect to the display device emitted light would correspond with the dot-dot-dashed contour at 402 in FIG. 4A. Consequently, when viewing the display device emitting a linearly polarized image oriented as shown, a spectral binocular disparity would result corresponding to the dashed contour at 408 in FIG. 4C.

Figure 8B:
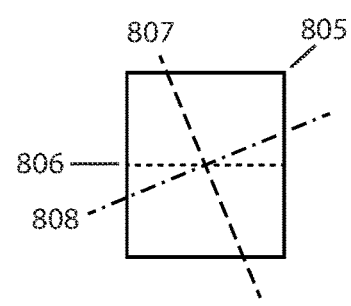
FIG. 8B is a diagram of a common orientation of linearly polarized light emitted by a display device and a preferable orientation of color-selective polarization filters incorporated into a first lens and a second lens of the spectacle eyewear device according to an embodiment of the present invention.

In another example, in FIG. 8B the rectangle at 805 depicts a display screen and the dotted line 806 depicts a horizontal orientation of light emitted by the screen. A first and second polarization filter configured with the same intermediate orientations as discussed above again produces a spectral binocular disparity effect: the first filter axis 807 is 67.5 degrees clockwise relative to the orientation of the display light, and the second filter axis 808 is 22.5 degrees counter-clockwise relative to the orientation of the display light.

Figure 8C:
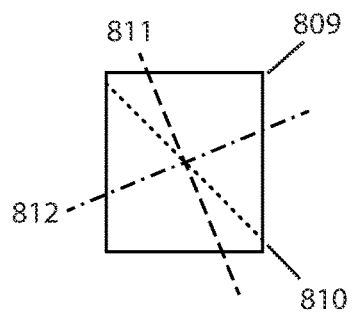
FIG. 8C is a diagram of a common orientation of linearly polarized light emitted by a display device and a preferable orientation of color-selective polarization filters incorporated into a first lens and a second lens of the spectacle eyewear device according to an embodiment of the present invention.

In another example, in FIG. 8C the rectangle at 809 depicts a display screen and the dotted line 810 depicts a 45 degree orientation of polarized light emitted by the screen. This orientation is common in mobile devices such as phones and tablets. A first and second polarization filter configured with the same intermediate orientations as discussed above again produces a spectral binocular disparity effect: the first filter axis 811 is 22.5 degrees clockwise relative to the orientation of the display light, and the second filter axis 812 is 67.5 degrees counter-clockwise relative to the orientation of the display light.

Figure 8D:
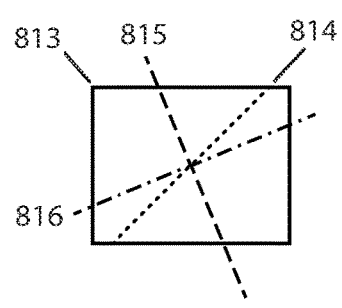
FIG. 8D is a diagram of a common orientation of linearly polarized light emitted by a display device and a preferable orientation of color-selective partial polarization filters incorporated into a first lens and a second lens of the spectacle eyewear device according to an embodiment of the present invention.

In another example, in FIG. 8D the rectangle at 813 depicts a display screen and the dotted line 814 depicts a 135 degree orientation of polarized light emitted by the screen. This orientation is common in mobile devices, such as phones and tablets. A first and second polarization filter configured with the same intermediate orientations as discussed above again produces an identical spectral binocular disparity: the first filter axis 815 is 67.5 degrees counter-clockwise relative to the orientation of the display light, and the second filter axis 816 is 22.5 degrees clockwise relative to the orientation of the display light.

Note that in any of the foregoing examples depicted in FIG. 8A, FIG. 8B, FIG. 8C and FIG. 8D, equivalent spectral binocular disparity is also obtained by configuring the polarization axes of the filters in a mirror image of what is depicted, i.e., 22.5 degrees and 112.5 degrees clockwise from the horizontal axis.

Eyewear lenses are typically manufactured in a quasi-rectangular shape (e.g. combining various curves and straight lines) that is machined from a raw lens material substrate. Prior to such machining or cutting step the raw lens material is referred to as a lens blank. Eyewear lens blanks may have a rectangular shape, whereby the polarization axis is most commonly oriented along the short dimension of the rectangle. In some cases the eyewear lens blank may have a round shape, but the polarization filter only comprises a quasi-rectangular "band" that is centered within the round shape and in such cases the polarization axis is again oriented along the short dimension of the quasi-rectangular band. In some cases the eyewear lens blank may incorporate a polarization filter over substantially all of a round shape, and the lens blank may feature some other registration mark or a mold sprue that is used as a reference point for defining the polarization axis.

Figure 9A:
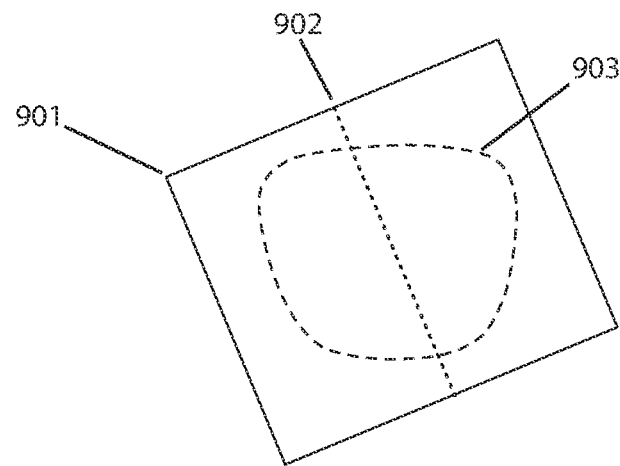
FIG. 9A is a diagram of a rectangular lens blank that has been oriented in such a way that a lens may be cut from the blank, whereby the lens blank orientation and subsequent lens shape cutting process results in a first lens having a polarization axis oriented 67.5 degrees clockwise from the horizontal axis.
Figure 9B:
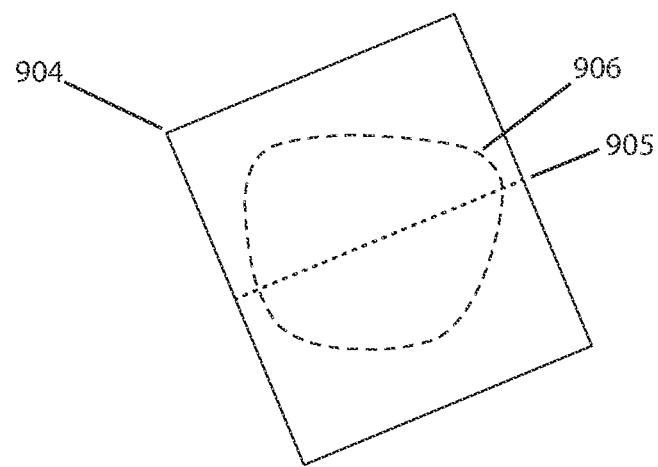
FIG. 9B is a diagram of a rectangular lens blank that has been oriented in such a way that a lens may be cut from the blank, whereby the lens blank orientation and subsequent lens shape cutting process results in a second lens having a polarization axis oriented 157.5 degrees clockwise from the horizontal axis.

In order to manufacture ophthalmic lenses in accordance with the present invention, it is necessary to machine the lens shape in such a way that the polarization axis of a filter incorporated into a lens is oriented along a preferable direction, such as one of the intermediate orientations discussed previously (e.g., 22.5 degrees, 67.5 degrees, 112.5 degrees or 157.5 degrees clockwise from the horizontal axis), or at any other desired orientation. Preferably the lens blank material need not be specified separately for use in right or left lenses, therefore it is desirable and preferable to source lens blank material in sufficient size as to enable manufacturing of a desired lens shape in multiple orientations. In FIG. 9A, an example lens blank material is depicted by a rectangle 901, wherein the lens blank comprises a polarization filter having its principle axis disposed along the dotted line 902. An example lens shape is indicated by a dashed line 903. By orienting the lens blank 901 and then machining the lens shape as indicated the resulting lens will provide a first lens wherein the polarization axis is 22.5 degrees counter-clockwise from the vertical axis of the lens. In FIG. 9B, an example lens blank material is depicted by a rectangle 904, wherein the lens blank comprises a polarization filter having its principle axis disposed along the dotted line 905, and an example lens shape is indicated by a dashed line 906. By orienting the lens blank 904 and then machining the lens shape 906 as indicated the resulting lens will provide a second lens wherein the polarization axis is 67.5 degrees clockwise from the vertical axis of the lens. The process just described consisting of orienting a lens shape prior to machining a desired lens shape is referred to as "blocking" by opticians. Typically blocking is used to orient refractive lenses having a non-zero cylindrical power component that must be precisely oriented to manufacture glasses that correct for astigmatism. Therefore, optical equipment already comprises various scales and gauges for precisely orienting lenses. These methods may be adapted to perform the specific polarization orientation blocking as shown herein.

Figure 10:
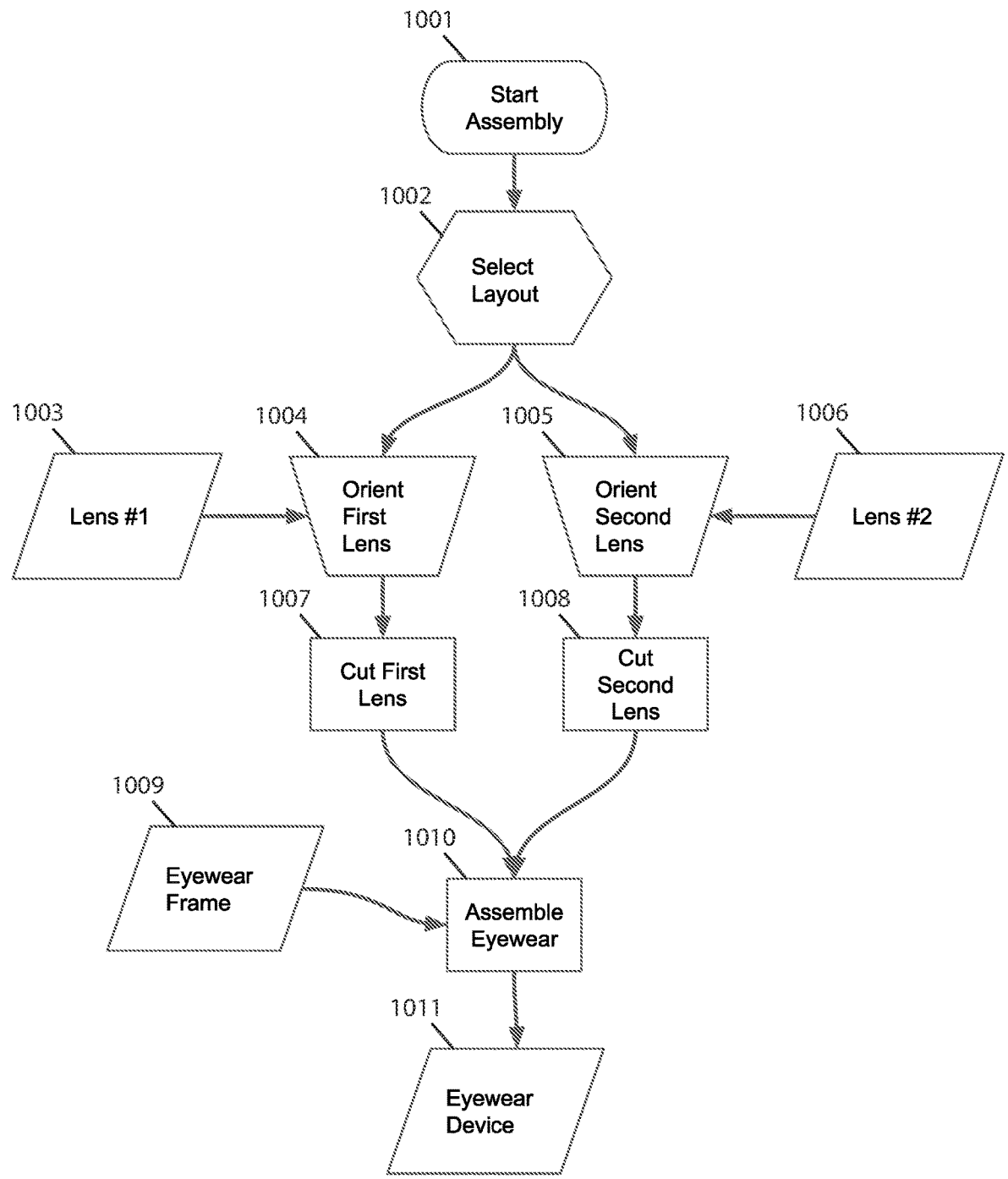
FIG. 10 is a process diagram of a method of manufacturing an embodiment of a spectacle eyewear device according to an embodiment of the present invention.

An embodiment of a method for manufacturing a spectacle eyewear device in accordance with the present invention is depicted by a process flow diagram shown in FIG. 10. The method begins at 1001, and proceeds to a decision point 1002 where a desired lens layout is selected. As discussed previously, an eyewear device comprising two polarization filters may be configured in such a way that the filters are oriented along the common angles such as zero and 90 degrees, thereby enabling compatibility of the eyewear with a specific type of display outputting light at either horizontal or vertical orientation, or along various intermediate angles such as 22.5 degrees, 67.5 degrees, 112.5 degrees or 157.5 degrees, thereby enabling broad compatibility with displays outputting polarized light at any of the common four orientations. In some cases it may be preferable to configure the filters in such a way that a specific eye (i.e., the users right eye, or users left eye) is provided with a desired amount of filtering. For example, in some embodiments, it may be desirable to have the filter with greater attenuation positioned over the non-dominant eye of the user, when viewing a display device with a specific orientation of polarized light that is known in advance that the user desires to use the eyewear with. In some embodiments, it may be desirable to provide an eyewear device intended for use only with fixed orientation computer displays and having a greater spectral binocular disparity effect while sacrificing compatibility with mobile devices (i.e., devices with polarization output oriented at 45 degrees or 135 from horizontal), which may be achieved by orienting the filters at zero degrees and 90 degrees from horizontal. Alternatively, the desired orientation may be determined by a fitting procedure such as a person adjusting the orientation of a trial lens while viewing a test image and then selecting a desired level of binocular rivalry to satisfy the person's preferences, e.g. preference for visibility of specific visual feature, and/or preference for visual comfort by limiting the amount of the magnitude of spectral binocular disparity.

After a desired orientation of the eyewear filters is selected, the process continues by providing a first lens blank 1003 and a second lens blank 1006, then orienting the first lens according to the selected configuration 1004, and orienting the second lens according to the selected configuration 1005, and then cutting 1007 a first eyewear lens shape from the first lens blank, and cutting 1008 a second eyewear lens shape from the second lens blank. After machining the lens blanks into a pair of finished eyewear lenses, the process continues by providing an eyewear frame 1009 and then assembling 1010 the lenses into the frame, resulting in a finished eyewear device 1011.

Figure 5C:
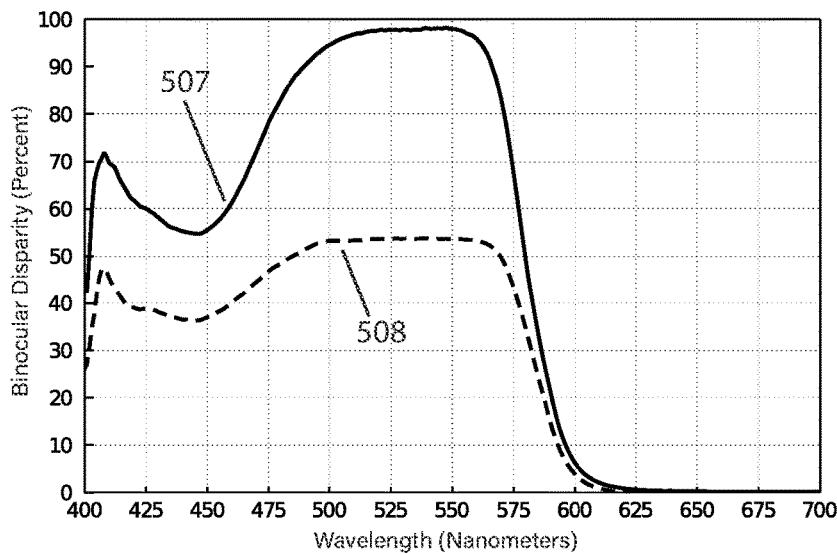
FIG. 5C is a graph of the spectral binocular disparity with respect to linearly polarized light arising from two possible configurations of a pair of lenses comprising the red-pink color-selective partial polarization filter material.

The manufacturing method as described above is configured to construct two embodiments of spectacle eyewear devices as follows: the first eyewear device (E1) comprised a pair of lenses having the orange-pink color-selective partial polarization filter as described along with FIG. 4A. The lenses were configured with the polarization axes oriented at 22.5 degrees and 112.5 degrees clockwise from the horizontal axis, therefore producing the spectral binocular disparity as shown in FIG. 4C at 408 when viewing display device outputting a polarized image polarized in any of the standard orientations. A second eyewear device (E2) comprised a pair of lenses having the red-pink color-selective partial polarization filter as shown in FIG. 5A. The lenses in device E2 were also configured with the polarization axes oriented at 22.5 degrees and 112.5 degrees clockwise from the horizontal axis, therefore producing the spectral binocular disparity as shown in FIG. 5C at 508 when viewing display device outputting a polarized image in any of the standard orientations.

The inventor tested the devices E1 and E2 on himself while viewing a variety of display devices including a computer screen, a laptop, and a mobile phone. The inventor noted that the first eyewear (E1) produced a moderate amount of binocular rivalry when viewing any of the display devices, and the visual effect was particularly striking when viewing certain types of content comprising rich color information, such as immersive 3D games and high frame rate action video. The inventor further noted that the second eyewear (E2) produced a strong amount of binocular rivalry, which was found to be visually uncomfortable to the inventor's experience. Note that the inventor has normal color vision. The inventor further noticed that the eyewear lenses appeared to be completely identical under ordinary indoor illumination, and the differential filtering of the lenses was only detectable when holding up the glasses in front of a computer screen or viewing a mobile phone or other device emitting a color image in polarized light.

The inventor then tested the eyewear devices E1 and E2 with a person who had protanomaly believed to be between a mild to moderate severity. A variety of color-rich content was viewed on a computer screen. The person reported a positive experience eyewear E1, with particularly impactful results observed when viewing a color photograph of the crab nebula, which notably has a red "halo" around its perimeter, in which the person reported the red halo color and contrast as being more easily perceived, and when viewing a pie chart that was colored in shades of yellow and orange, which the person reported as being easier to read whereas such colors are known to appear very similar to the vision of a person with protanomaly. However, the person wearing eyewear E2 reported the binocular rivalry effect was excessive and caused visual discomfort. In a further test, the person performed a computer-based Ishihara test under three conditions: without glasses, the hidden digit was seen in approximately 2 out of 12 test plates. Wearing the E1 glasses the person saw the hidden digit in approximately 3 out of the 12 plates. And with the E2 glasses the person saw the hidden digit in approximately 4 out of the 12 plates. In the prior description "approximately" is used to describe the outcome of plate visibility because due to repeated administration of the same test, a true pass-fail was not possible to determine, however based upon subjective descriptions of visual content the inventor attests that the listed outcomes are a reasonable interpretation of the person's subjective descriptions.

The inventor then tested the eyewear devices E1 and E2 with a person who had protanomaly believed to be graded moderate or severe. A variety of color-rich content was viewed on a computer screen using the eyewear. The person reported a positive experience eyewear E2 and reported an effective but less impactful experience with eyewear E1. The person described particular difficulty with interpreting "redline" documents in his work, which are word-processing documents using change-tracking comprising a mixture of red-colored and black-colored text. Difficulty differentiating between red and black colors is a common problem experienced by persons with protanomaly, and especially so by persons with strong protanomaly or protanopia. The inventor devised a test comprising viewing a page of approximately 200 words on computer screen with the words written in black color, wherein approximately 5 words were changed to red at random locations within the document. When wearing the E2 eyewear, the person was able to locate the red-colored words with essentially no delay. When wearing the E1 eyewear, the person was able to locate the red-colored words with a moderate delay (e.g. 10 seconds). When the person was not wearing any eyewear, the person was only able to locate the red-colored words after a significant delay (e.g. longer than 30 seconds).

Figure 6C:
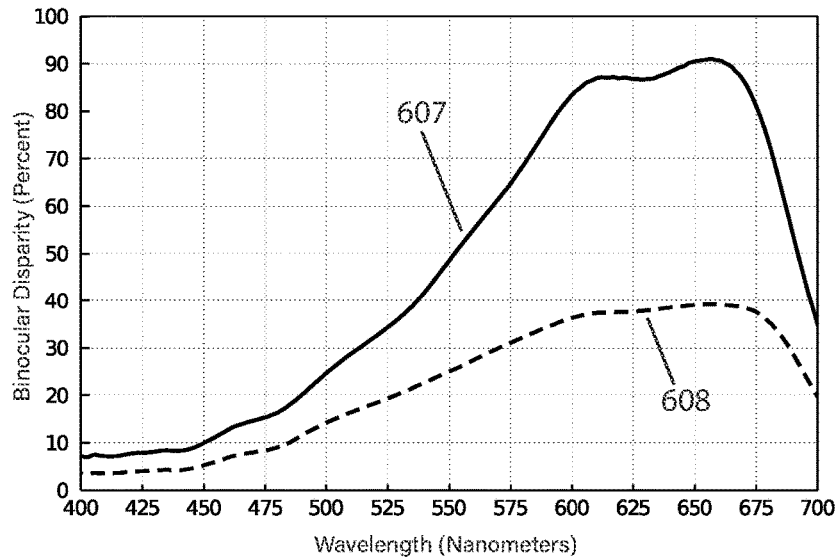
FIG. 6C is a graph of the spectral binocular disparity with respect to linearly polarized light arising from two possible configurations of a pair of lenses comprising the blue color-selective partial polarization filter material.

The inventor then constructed a third eyewear device (E3) comprising a pair of lenses incorporating the blue color-selective partial polarization filter as described along with FIG. 6A. The lenses were configured with the polarization axes oriented at 22.5 degrees and 112.5 degrees clockwise from the horizontal axis, therefore producing the spectral binocular disparity as shown in FIG. 6C at 608 when viewing display device outputting a polarized image polarized in any of the standard orientations.

Figure 7C:
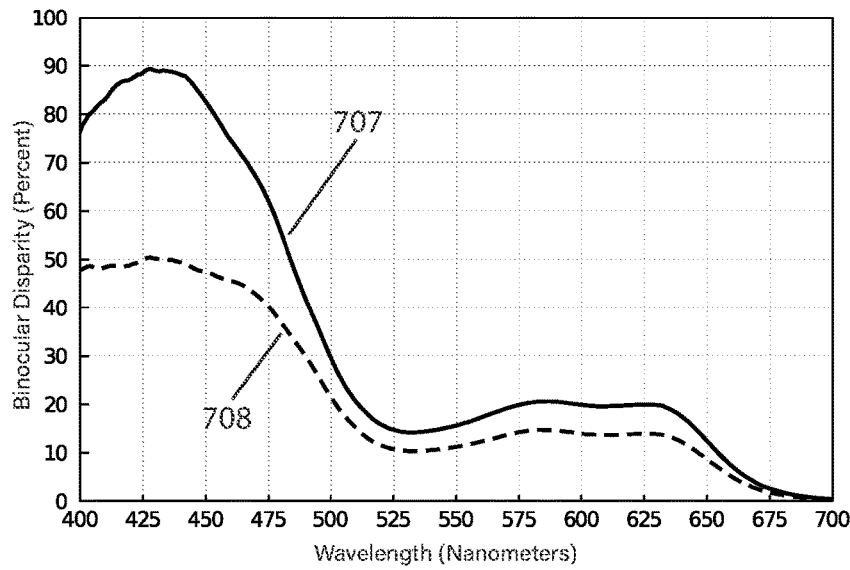
FIG. 7C is a graph of the spectral binocular disparity with respect to linearly polarized light arising from two possible configurations of a pair of lenses comprising the yellow-green color-selective partial polarization filter material.

The inventor then constructed a fourth eyewear device (E4) comprising a pair of lenses incorporating the yellow-green color-selective partial polarization filter as shown in FIG. 7A. The lenses in device E4 were also configured with the polarization axes oriented at 22.5 and 112.5 degrees clockwise from the horizontal axis, therefore producing the spectral binocular disparity as shown in FIG. 7C at 7078 when viewing display device outputting a polarized image polarized in any of the standard orientations.

The inventor tested device E3 on himself and noted that a similar "pop-out" effect was created that was particularly noticeable when viewing red colors within the polarized image emitted by a display device, however the average brightness of red colors was lower due to the relatively low transmittance between 600 nanometers to 650 nanometers in the lenses. Additionally, the overall blue-colored tinting of the lenses was aesthetically preferable compared to the pink-shaded lenses of E1 and E2, therefore an ophthalmic eyewear comprising the blue-tinted color-selective polarization filter may be preferable for some individuals. Based on his knowledge of color vision theory, the inventor attests that due the higher overall brightness of red shade colors in the E1 and E2 embodiments, the use of color-selective partial polarization filters with high transmittance in the 600 nanometer to 650 nanometer sub-band, e.g., the orange-pink or red-pink filters as discussed herein, may be preferable for use by persons with protan-type color vision deficiencies including protanomaly and protanopia, and further that the blue-tinted embodiment E3 may be preferable for use by persons with deutan-type color vision deficiencies, i.e., deuteranomaly and deuteranopia.

The inventor also tested device E4 on himself and noted the "pop-out" effect was relatively small in magnitude and produced mainly a subtle sense of additional depth when viewing a color image. The inventor attests that a device substantially consistent with embodiment E4 may be a preferable embodiment for use by persons with normal color vision, whereas the eyewear produced a subtle enhancement to color vision and enhancement to depth perception of displayed image content. The inventor further attests the embodiment E4 may be preferable for use by persons with a tritan-type color vision deficiency including tritanomaly and tritanopia whereas the eyewear causes a binocular rivalry effect for blue shades that may be difficult to perceive by the person with tritan-type color vision deficiency.

According to the inventor's observations and experience with the trial embodiments E1, E2, E3 and E4, and other experiments performed with color-selective partial polarization filtering materials as described herein, a spectral binocular disparity of sufficient magnitude to induce binocular rivalry occurs when the lenses comprise a color-selective partial polarization filter wherein the spectral polarization efficiency has a sufficient contrast between a region of relatively higher polarization efficiency and relatively lower polarization efficiency, wherein the regions consist of at least 50 nanometer wide sub-bands including a first sub-band comprising a 50 nanometer wide sub-band located between 450 nanometers and 650 nanometers wherein the mean spectral polarization is at least 30 percent, and, a second non-overlapping sub-band comprising a 50 nanometer wide sub-band also located between 450 nanometers and 650 nanometers wherein the mean spectral polarization efficiency is less than 20 percent, and furthermore, the polarization filters of each lens are oriented relative to each other in such a way that they are separated by an angle of between degrees to 90 degrees, and preferably are substantially oriented perpendicular to each other. The first sub-band wherein the mean spectral polarization efficiency is relatively higher as described is preferable to enable the lenses to provide sufficiently different spectral transmittances relative to the polarized light emitted by a display, which may be fine-tuned by selecting the relative orientation of the axes of filters between a pair of lenses. The second sub-band wherein the mean spectral polarization efficiency is relatively lower is preferable as it enables the lenses to provide a relatively high transmittance of non-polarized light thereby enabling use of the lenses for indoor use where display devices are most commonly used and where the typical surface illumination range is relatively low (compared to outdoor daylight) and it is therefore preferable to have lenses with an overall visible light transmittance in the Category 1 or Category 0 filter ranges, e.g. between 40 percent to 75 percent, or between 75 percent to 90 percent. Furthermore, in accordance with the teachings herein, a preferable relative orientation of the polarization axes of the filters may be configured according to one or more preferable criteria including causing a preferable amount of spectral binocular disparity to be seen by a person, and including causing a specific eye to receive a preferable amount of spectral filtering, while the person is using the lenses while viewing a display device emitting linearly polarized light with one or more possible orientations.

Figure 11:
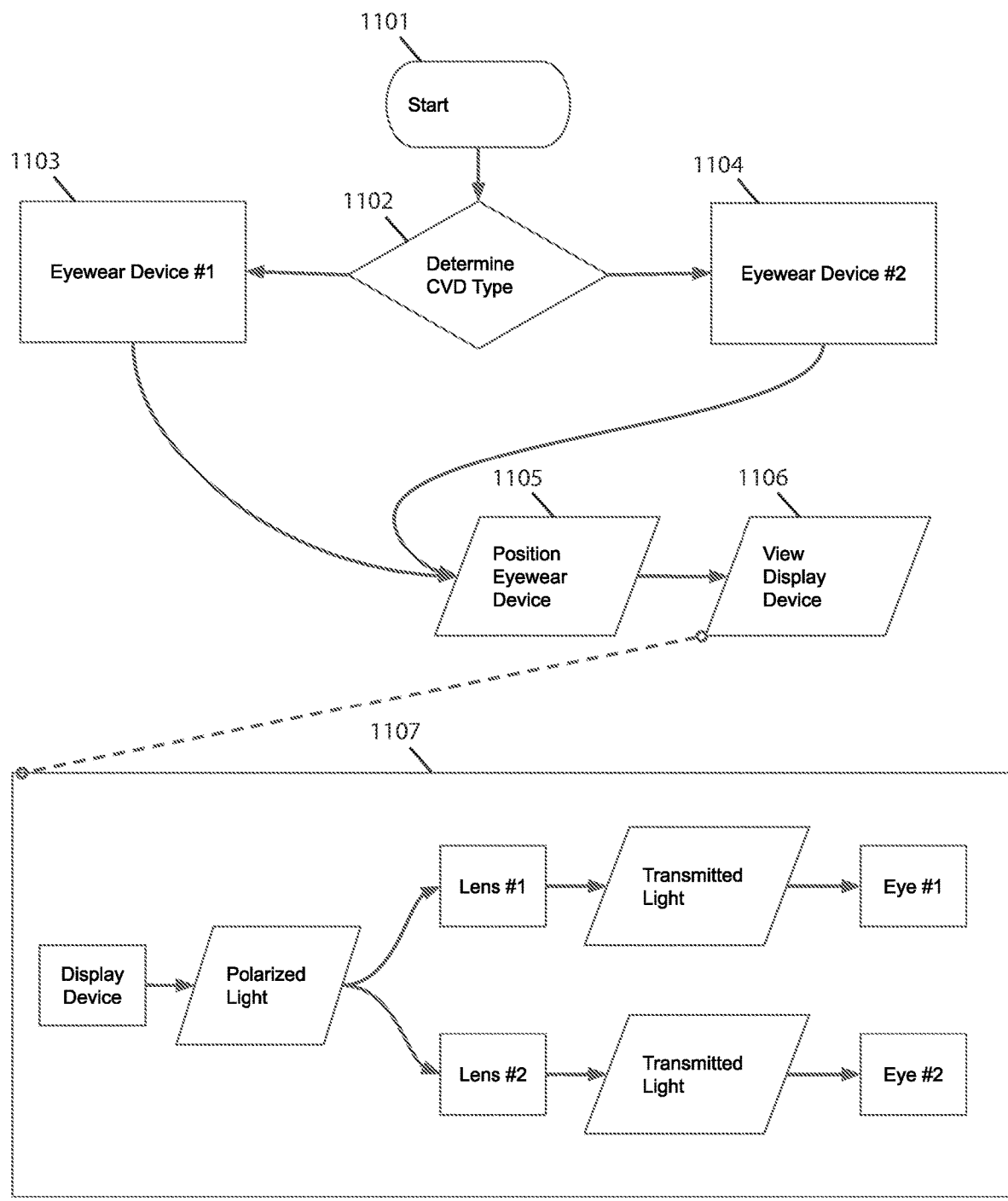
FIG. 11 is a process diagram depicting an embodiment of a method for modifying the color vision of a person while viewing a display device emitting a color image according to an embodiment of the present invention.

In light of the foregoing discussion regarding the preference for color-selective partial polarization filters of various colors in relation to their preferred use by sub-populations of persons depending upon their color vision type, it is useful to consider a method of fitting or prescribing lenses to a person, and then engaging in the use of the lenses to achieve a preferred amount of binocular rivalry that is selected and/or customized to the individual person. An embodiment of such a method is depicted by the process diagram in FIG. 11. The method starts at 1101 and proceeds to a decision point 1102 where the type of color vision of a person is assessed. In some embodiments, the assessment may comprise administering a color vision test, such as the Ishihara test or the Farnsworth D-15 test. In other embodiments, the assessment may comprise conducting a survey. In yet in other embodiments, the assessment may comprise the person clicking on a button or hyperlink corresponding to their type of color vision. In some embodiments, the assessment may comprise only rough categorization of color vision type, such as a binary choice between "normal" and "color blind", or a trinary choice between "normal", "mild or moderately color blind", and "strong or severely color blind". In some embodiments, the assessment may comprise a fine categorization of color vision type, providing any number of possible categories, or a continuous scale of severity and orientation of color confusion axis and/or color vision deficiency type classification. In some embodiments, the assessment may comprise the person looking through an ophthalmic device at a test color image displayed in polarized light while rotating a filter or lens until an image transformation is observed, such as revealing a hidden symbol within the image. Following the assessment step a preferable eyewear device is selected and provided to the person, comprising a selection between at least two alternatives: a first lens configuration 1103 or a second lens configuration 1104, or the determination of a custom configuration based upon a quantitative assessment of the person's color vision and/or preferences. The selection may comprise more than two alternative lens configurations. Regardless of the number of alternative lens configurations that may be selected, one such lens configuration is selected, optionally provided as the input to a manufacturing process (e.g. according to the process of FIG. 10), and then the selected lenses and/or device incorporating such lenses is provided to the person and positioned 1105 proximally to the person's eyes in such a way that the person is able to view a display device 1106 emitting a color image in polarized light. The sub-process of viewing the display device through the eyewear filters is further represented at 1107, which is a reproduction of the process diagram from FIG. 2 described above.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object or between objects.

In addition, reference to "first," "second," "third," and etc. members throughout the disclosure (and in particular, claims) are not used to show a serial or numerical limitation but instead are used to distinguish or identify the various members of the group.

Calculations required to implement any of the manufacturing and/or design methods disclosed herein and/or sub-processes within any such methods may be performed, for example, on a computer having 3.2 GHz 6-Core Intel Core i7 processor and 64 GB of RAM using the open source Julia programming language. Spectrophotometric measurements may be performed, for example, using an Ocean Optics USB4000 spectrophotometer and collected using the Ocean-View application available from Ocean Optics, Inc. It should be understood by those of ordinary skill in the art that the methods disclosed herein are not limited to the above implementation hardware and/or software elements and are independent of the aforementioned computer and/or system architecture. Accordingly, the methods may equally be implemented on other computing platforms, use other computational software (whether commercially available or coded specifically for the filter design methods), and also may be hard-wired into a circuit or other computational component.

What is claimed is:

1. A spectacle eyewear device comprising:
   a first lens configured to filter light received by a first eye of a person wearing the spectacle eyewear device, the first lens comprises a first color-selective partial polarization filter;
   a second lens configured to filter light received by a second eye of the person wearing the spectacle eyewear device, the second lens comprises a second color-selective partial polarization filter; and,
   within a first spectral sub-band consisting of a 50 nanometer wide band located between 450 nanometers to 650 nanometers, the mean spectral polarization efficiency of the first and second color-selective partial polarization filters is greater than 30 percent;
   within a second spectral sub-band consisting of a 50 nanometer wide band located between 450 nanometers to 650 nanometers and not overlapping with the first spectral sub-band, the mean spectral polarization efficiency of the first and second color-selective partial polarization filters is less than 20 percent; and,
   the polarization axis of the first color-selective partial polarization filter is oriented between 30 degrees to 90 degrees away from the polarization axis of the second color-selective partial polarization filter.

2. The spectacle eyewear device of claim 1, wherein the polarization axis of the first color-selective partial polarization filter is substantially perpendicular to the polarization axis of the second color-selective partial polarization filter.

3. The spectacle eyewear device of claim 2, wherein the polarization axis of the first color-selective partial polarization filter is substantially oriented 22.5 degrees clockwise from the horizontal axis of the first lens, and the polarization axis of the second color-selective partial polarization filter is substantially oriented 112.5 degrees from the horizontal axis of the second lens.

4. The spectacle eyewear device of claim 3, wherein with respect to non-polarized white light having a spectral power distribution substantially consistent with a 4100K CCT phosphor-converted blue-pumped light-emitting diode, the first lens and the second lens have substantially the same color appearance.

5. The spectacle eyewear device claim 2, wherein the polarization axis of the first color-selective partial polarization filter is substantially oriented 67.5 degrees clockwise from the horizontal axis of the first lens, and the polarization axis of the second color-selective partial polarization filter is substantially oriented 157.5 degrees clockwise from the horizontal axis of the second lens.

6. The spectacle eyewear device of claim 5, wherein with respect to non-polarized white light having a spectral power distribution substantially consistent with a 4100K CCT phosphor-converted blue-pumped light-emitting diode, the first lens and the second lens have substantially the same color appearance.

7. The spectacle eyewear device of claim 2, wherein with respect to non-polarized white light having a spectral power distribution substantially consistent with a 4100K CCT phosphor-converted blue-pumped light-emitting diode, the first lens and the second lens have substantially the same color appearance.

8. The spectacle eyewear device of claim 1, wherein with respect to non-polarized white light having a spectral power distribution substantially consistent with a 4100K CCT phosphor-converted blue-pumped light-emitting diode, the first lens and the second lens have substantially the same color appearance.

9. A method of modifying the color vision of a person while the person is viewing a display device emitting an image in linearly polarized light, the method comprising:
   providing a first lens and a second lens;
   positioning the lenses proximally to the eyes of the person in such a way that the first lens substantially filters light received by the first eye of the person, and the second lens substantially filters light received by the second eye of the person; and,
   the person viewing the display device through the lenses while the display device displays a color image in linearly polarized light; wherein,
   the first lens comprises a first color-selective partial polarization filter;
   the second lens comprises a second color-selective partial polarization filter; and
   within a first spectral sub-band consisting of a 50 nanometer wide band located between 450 nanometers to 650 nanometers, the mean spectral polarization efficiency of the first and second color-selective partial polarization filters is greater than 30 percent, and,
   within a second spectral sub-band consisting of a 50 nanometer wide band located between 450 nanometers to 650 nanometers and not overlapping with the first spectral sub-band, the mean spectral polarization efficiency of the first and second color-selective partial polarization filters is less than 20 percent, and
   the polarization axis of the first color-selective partial polarization filter is between 30 degrees to 90 degrees away from the polarization axis of the second color-selective partial polarization filter.

10. The method of claim 9, wherein the person has color vision deficiency.

11. The method of claim 10, wherein the polarization axis of the first color-selective partial polarization filter is substantially perpendicular to the polarization axis of the second color-selective partial polarization filter.

12. The method of claim 11, wherein the polarization axis of the first color-selective partial polarization filter is substantially oriented 22.5 degrees clockwise from the horizontal axis of the first lens, and the polarization axis of the second color-selective partial polarization filter is substantially oriented 112.5 degrees clockwise from the horizontal axis of the second lens.

13. The method of claim 11, wherein the polarization axis of the first color-selective partial polarization filter is substantially oriented 67.5 degrees clockwise from the horizontal axis of the first lens, and the polarization axis of the second color-selective partial polarization filter is substantially oriented 157.5 degrees clockwise from the horizontal axis of the second lens.

14. The method of claim 9, wherein the polarization axis of the first color-selective partial polarization filter is substantially perpendicular to the polarization axis of the second color-selective partial polarization filter.

15. The method of claim 14, wherein the polarization axis of the first color-selective partial polarization filter is substantially oriented 22.5 degrees clockwise from the horizontal axis of the first lens, and the polarization axis of the second color-selective partial polarization filter is substantially oriented 112.5 degrees clockwise from the horizontal axis of the second lens.

16. The method claim 14, wherein the polarization axis of the first color-selective partial polarization filter is substantially oriented 67.5 degrees clockwise from the horizontal axis of the first lens, and the polarization axis of the second color-selective partial polarization filter is substantially oriented 157.5 degrees clockwise from the horizontal axis of the second lens.

17. A system for modification of human color vision while viewing a color image emitted by a display device in linearly polarized light, the system comprising:
   a display device emitting a color image in linearly polarized light;
   a first lens configured to filter the light emitted by the display device, wherein the first lens comprises a first color-selective partial polarization filter;
   a second lens configured to filter the light emitted by the display device, wherein the second lens comprises a second color-selective partial polarization filter; and,
   within a first spectral sub-band consisting of a 50 nanometer wide band located between 450 nanometers to 650 nanometers, the mean spectral polarization efficiency of the first and second color-selective partial polarization filters is greater than 30 percent, and,
   within a second spectral sub-band consisting of a 50 nanometer wide band located between 450 nanometers to 650 nanometers and not overlapping with the first spectral sub-band, the mean spectral polarization efficiency of the first and second color-selective partial polarization filters is less than 20 percent, and
   the first lens and the second lens are oriented in such a way that the polarization axis of the first color-selective partial polarization filter is between 30 to 90 degrees away from the polarization axis of the second color-selective partial polarization filter.

18. The system of claim 17, wherein the first lens and the second lens are oriented in such a way that the polarization axis of the first color-selective partial polarization filter is substantially perpendicular to the polarization axis of the second color-selective partial polarization filter.

19. The system of claim 18, wherein the polarization axis of the first color-selective partial polarization filter is substantially oriented 22.5 degrees clockwise from the horizontal axis of the first lens, and the second polarization axis of the color-selective partial polarization filter is substantially oriented 112.5 degrees from the horizontal axis of the second lens.

20. The system of claim 18, wherein the polarization axis of the first color-selective partial polarization filter is substantially oriented 67.5 degrees clockwise from the horizontal axis of the first lens, and the polarization axis of the second color-selective partial polarization filter is substantially oriented 157.5 degrees clockwise from the horizontal axis of the second lens.

* * * * *